United States Patent
Sugita et al.

(10) Patent No.: US 10,706,178 B2
(45) Date of Patent: Jul. 7, 2020

(54) DATA PROCESSING APPARATUS AND ACCESS CONTROL METHOD

(71) Applicant: Renesas Electronics Corporation, Tokyo (JP)

(72) Inventors: Yasuhiro Sugita, Tokyo (JP); Koji Adachi, Tokyo (JP); Yoichi Yuyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 323 days.

(21) Appl. No.: 15/808,960

(22) Filed: Nov. 10, 2017

(65) Prior Publication Data
US 2018/0173898 A1 Jun. 21, 2018

(30) Foreign Application Priority Data
Dec. 15, 2016 (JP) ................................ 2016-243306

(51) Int. Cl.
| | | |
|---|---|---|
| G06F 7/04 | (2006.01) | |
| G06F 12/00 | (2006.01) | |
| G06F 12/14 | (2006.01) | |
| G06F 13/00 | (2006.01) | |
| G11C 7/00 | (2006.01) | |
| G06F 21/70 | (2013.01) | |
| G06F 21/62 | (2013.01) | |

(52) U.S. Cl.
CPC .............. *G06F 21/70* (2013.01); *G06F 21/62* (2013.01)

(58) Field of Classification Search
CPC ...... G06F 21/70; G06F 21/62; G06F 21/6218; G06F 21/78; G06F 2221/2141; G06F 21/82
See application file for complete search history.

(56) References Cited

U.S. PATENT DOCUMENTS

| | | | |
|---|---|---|---|
| 8,713,217 B2 | 4/2014 | Nadehara | |
| 2005/0055477 A1* | 3/2005 | Kasser | G06F 21/52 710/15 |
| 2008/0086729 A1* | 4/2008 | Kondoh | G06F 9/5077 718/1 |
| 2009/0144465 A1* | 6/2009 | Sato | G06F 21/78 710/37 |
| 2013/0297901 A1* | 11/2013 | Nakada | G06F 12/1416 711/163 |

FOREIGN PATENT DOCUMENTS

JP 2010-250470 A 11/2010

* cited by examiner

*Primary Examiner* — Trong H Nguyen
(74) *Attorney, Agent, or Firm* — McDermott Will & Emery LLP

(57) ABSTRACT

According to one embodiment, a data processing apparatus includes an access controller configured to control access by a CPU to a processor. The access controller selects permission configuration information and an identifier table to be used for the access control using processor selection information output from the CPU, determines as intermediate identifier MID that corresponds to an access request identifier SPID output from the CPU using the selected identifier table, and determines accessibility of the CPU to the processor using the selected permission configuration information and the determined intermediate identifier MID.

10 Claims, 21 Drawing Sheets

DATA PROCESSING APPARATUS AND ACCESS CONTROL METHOD

CROSS-REFERENCE TO RELATED APPLICATIONS

This application is based upon and claims the benefit of priority from Japanese patent application No. 2016-243306, filed on Dec. 15, 2016, the disclosure of which is incorporated herein in its entirety by reference.

BACKGROUND

The present invention relates to a data processing apparatus and an access control method and relates to, for example, a data processing apparatus and an access control method including an access controller configured to control access of an operation unit to processors.

In general, a data processing apparatus includes an access controller configured to control access of an operation unit to peripheral resources (processors) in order to protect the peripheral resources from unauthorized access when the operation unit accesses the peripheral resources (processors).

Japanese Unexamined Patent Application Publication No. 2010-250470 discloses, in FIG. 3, a technique related to a computer system including a microprocessor, a memory, and a Memory Protection Unit (MPU). In the technique disclosed in Japanese Unexamined Patent Application Publication No. 2010-250470, access of the microprocessor to the memory is controlled using the MPU when the microprocessor accesses the memory.

SUMMARY

As described in Background, the data processing apparatus includes an access controller configured to control access to peripheral resources in order to protect the peripheral resources from unauthorized access when an operation unit accesses the peripheral resources. For example, the access controller controls access of the operation unit to each entry based on permission configuration information indicating an agreement regarding whether the operation unit can access the respective entries (processors) that the peripheral resources include.

However, in recent data processing apparatuses, the number of entries of the peripheral resources tends to increase. This leads to problems that the volume of the permission configuration information regarding the agreement on access rights of the operation unit to the respective entries (processors) becomes too large and the size of the circuit that stores the permission configuration information also increases.

The other problems of the prior art and the novel characteristics of the present invention will be made apparent from the descriptions of the specification and the accompanying drawings.

According to one embodiment, a data processing apparatus includes an access controller configured to control access by an operation unit to a processor. The access controller selects permission configuration information and an identifier table to be used for the access control using processor selection information output from the operation unit, determines an intermediate identifier that corresponds to an access request identifier output from the operation unit using the selected identifier table, and determines accessibility of the operation unit to the processor using the selected permission configuration information and the determined intermediate identifier.

According to the embodiment, it is possible to provide a data processing apparatus and an access control method capable of suppressing an increase in the size of the circuit.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

In the following description, with reference to the drawings, a first embodiment will be described.

Figure 1:
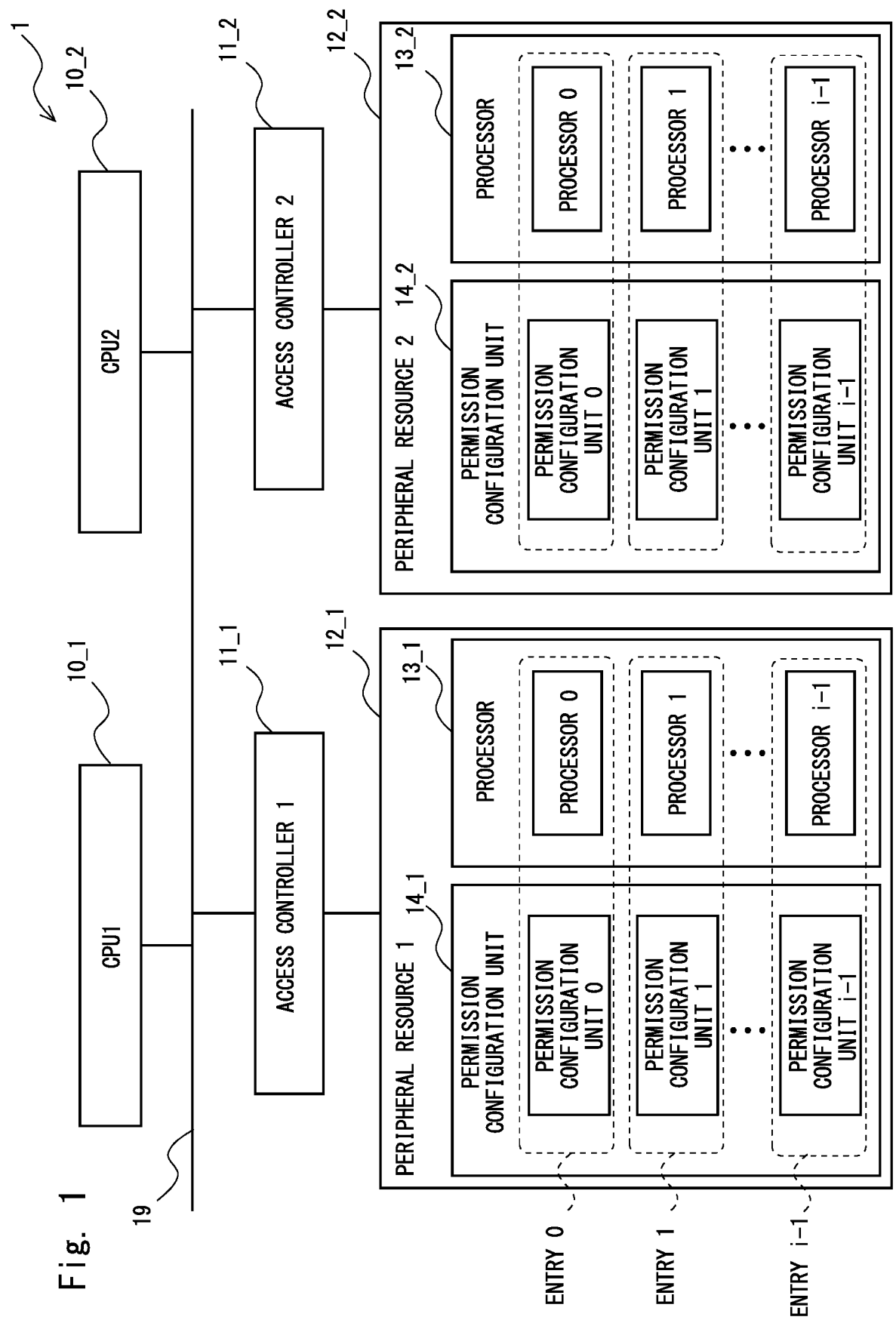
FIG. 1 is a block diagram showing a system configuration of a data processing apparatus according to a first embodiment.

FIG. 1 is a block diagram showing a system configuration of a data processing apparatus according to the first embodiment. As shown in FIG. 1, a data processing apparatus 1 according to this embodiment includes Central Processing Units (CPUs) 10_1 and 10_2, which are operation units, access controllers 11_1 and 11_2, and peripheral resources 12_1 and 12_2.

The CPUs 10_1 and 10_2 are configured in such a way that they can access the peripheral resources 12_1 and 12_2 via a bus 19. Each of the CPUs 10_1 and 10_2 executes a predetermined program. While a configuration in which the plurality of CPUs 10_1 and 10_2 are included (multicore) has been shown in the example shown in FIG. 1, only one CPU may be provided.

The access controller 11_1 controls access of the respective CPUs 10_1 and 10_2 to the peripheral resource 12_1. Further, the access controller 11_2 controls access of the respective CPUs 10_1 and 10_2 to the peripheral resource 12_2. While the configuration in which the access controllers 11_1 and 11_2 are provided in the outside of the peripheral resources 12_1 and 12_2 is shown in the example shown in FIG. 1, the access controller 11_1 may be provided inside the peripheral resource 12_1 and the access controller 11_2 may be provided inside the peripheral resource 12_2 in this embodiment.

The peripheral resource 12_1 includes a processor 13_1 and a permission configuration unit 14_1. The processor 13_1 is provided with at least one processors 0 to i−1 (i is an integer equal to or larger than one). Each of the respective processors 0 to i−1 provides the main function (interruption processing, etc.) of the peripheral resource 12_1. Further, the permission configuration unit 14_1 is provided with at least one permission configuration units 0 to i−1 (i is an integer equal to or larger than one). The respective permission configuration units 0 to i−1 set accessibility of the respective CPUs 10_1 and 10_2 to the processors 0 to i−1.

Specifically, the permission configuration unit 0 sets accessibility of the CPUs 10_1 and 10_2 to the processor 0 and the permission configuration unit 0 and the processor 0 configure an entry 0. Further, the permission configuration unit 1 sets accessibility of the CPUs 10_1 and 10_2 to the processor 1 and the permission configuration unit 1 and the processor 1 configure an entry 1. As described above, the respective permission configuration units 0 to i−1 set accessibility of the CPUs 10_1 and 10_2 to the respective processors 0 to i−1 and the respective permission configuration units 0 to i−1 and the respective processors 0 to i−1 configure entries 0 to i−1.

The peripheral resource 12_2 includes a processor 13_2 and a permission configuration unit 14_2. Since the configuration of the peripheral resource 12_2 is similar to that of the peripheral resource 12_1, the detailed descriptions thereof will be omitted. While the configuration in which the plurality of access controllers 11_1 and 11_2 and the plurality of peripheral resources 12_1 and 12_2 are included is shown in the example shown in FIG. 1, only one access controller and one peripheral resource may be provided.

The data processing apparatus 1 according to this embodiment controls the access of the CPUs 10_1 and 10_2 to the peripheral resources 12_1 and 12_2 using the access controllers 11_1 and 11_2 when the CPUs 10_1 and 10_2 access the peripheral resources 12_1 and 12_2. In the following description, the access control in the access controllers 11_1 and 11_2 will be described in detail.

Figure 2:
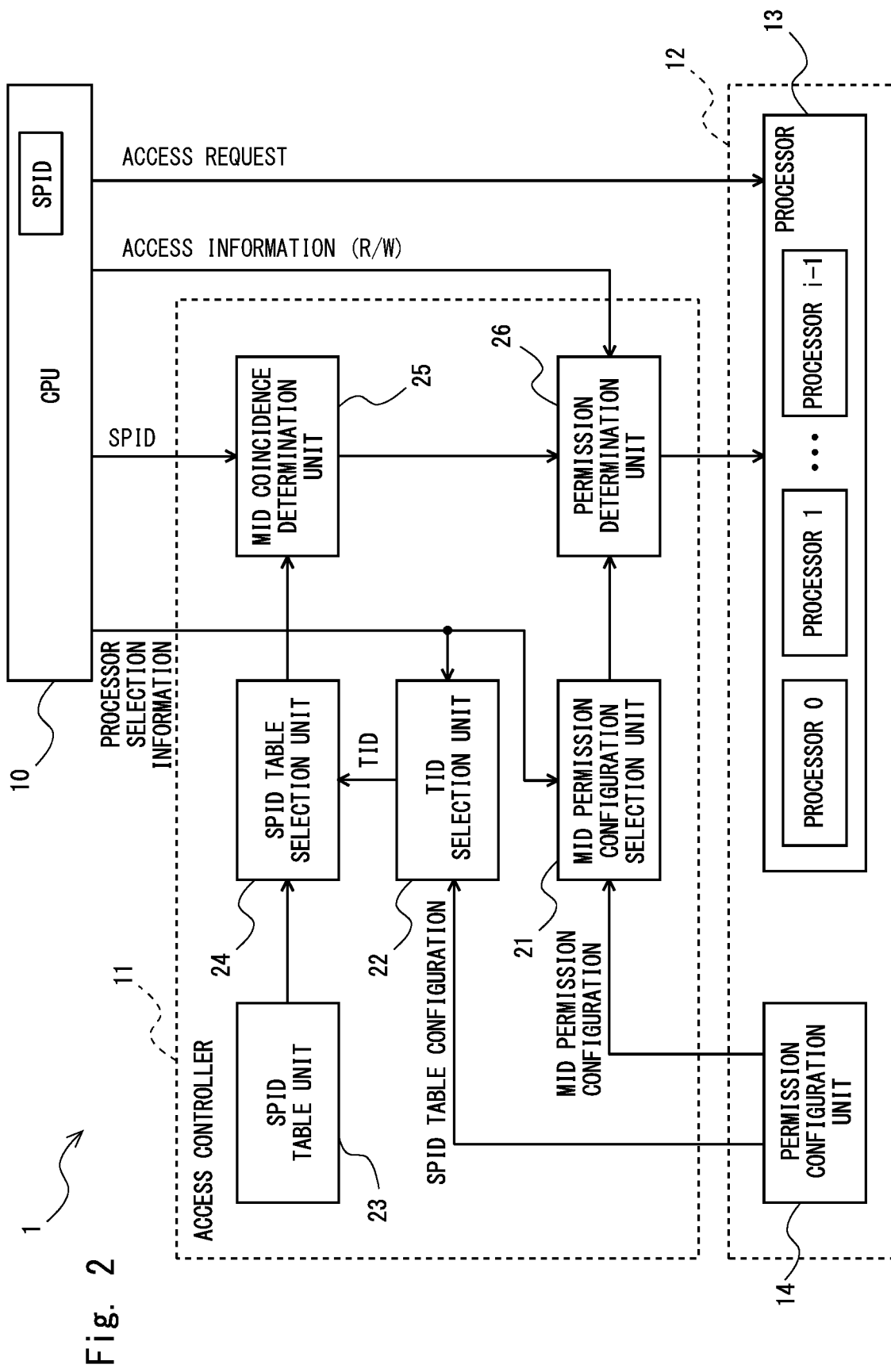
FIG. 2 is a block diagram showing a configuration example of the data processing apparatus according to the first embodiment.

FIG. 2 is a block diagram showing a configuration example of the data processing apparatus according to this embodiment. The data processing apparatus shown in FIG. 2 shows a part of the data processing apparatus shown in FIG. 1. Specifically, the data processing apparatus shown in FIG. 2 includes a configuration in which one CPU 10, one access controller 11, and one peripheral resource 12 are included for the sake of simplification of the explanation. In the following description, the configuration in which one CPU 10, one access controller 11, and one peripheral resource 12 are included will be described. However, the following description may also be applied to a configuration in which a plurality of CPUs 10, a plurality of access controllers 11, and a plurality of peripheral resources 12 are included (see FIG. 1).

As shown in FIG. 2, the data processing apparatus 1 includes the CPU 10, the access controller 11, and the peripheral resource 12. The access controller 11 includes an MID permission configuration selection unit 21, a TID selection unit 22, an SPID table unit 23, an SPID table selection unit 24, an MID coincidence determination unit 25, and a permission determination unit 26. Further, the peripheral resource 12 includes a processor 13 and a permission configuration unit 14.

The CPU 10 executes a predetermined program. Further, the CPU 10 stores an access request identifier (SPID: System Protection IDentification). The CPU 10 outputs, when sending a request for accessing the peripheral resource 12, processor selection information, the SPID, and access information (R/W etc.), which is information regarding the type of access such as read/write to the access controller 11. In the following description, a case in which the access information is access information (R/W) indicating read/write will be described as an example.

The processor 13 of the peripheral resource 12 is provided with processors 0 to i−1 (i is an integer equal to or larger than one). Each of the respective processors 0 to i−1 provides the main function (interruption processing, etc.) of the peripheral resource 12. Further, the peripheral resource 12 includes the permission configuration unit 14.

Figure 3:
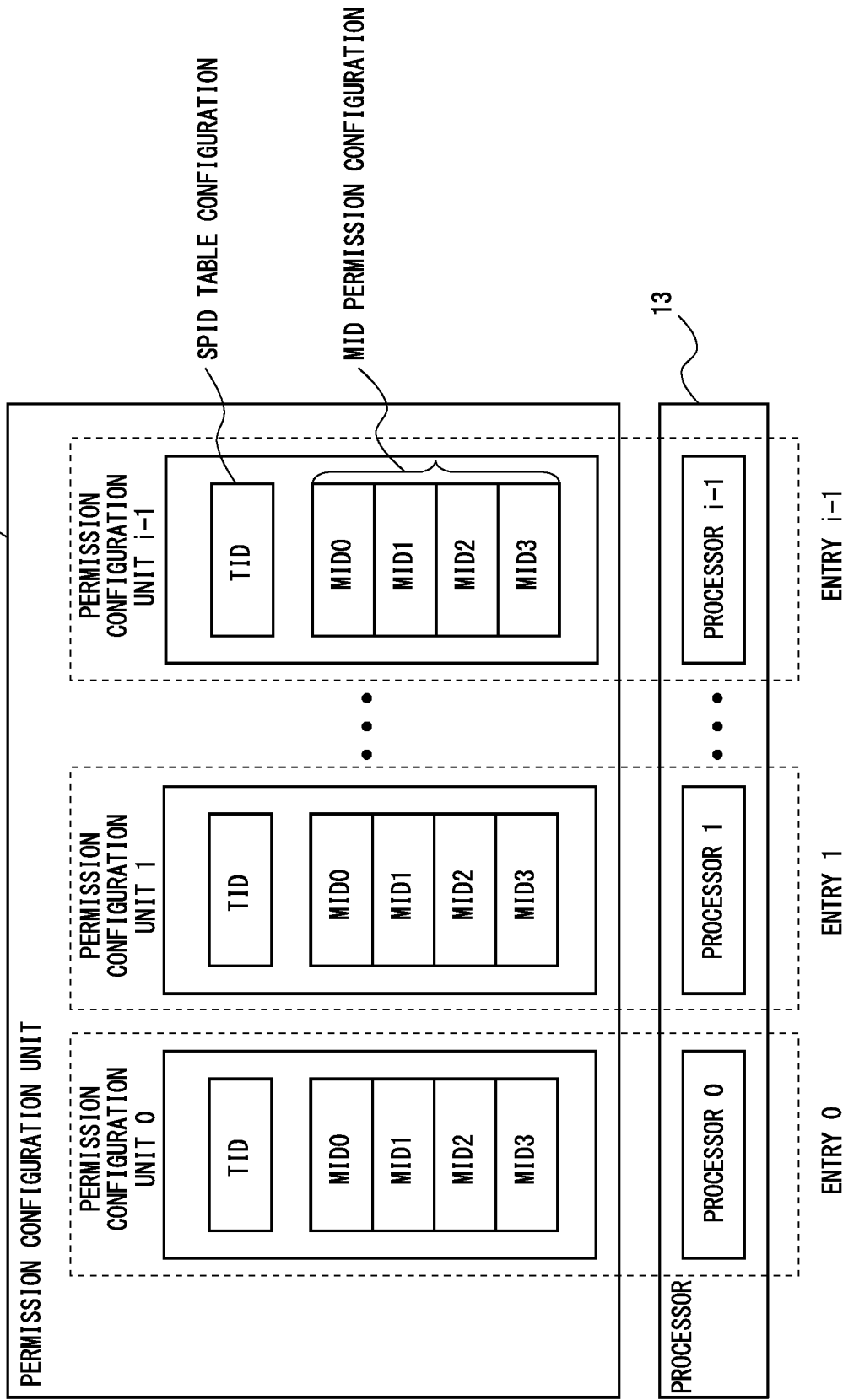
FIG. 3 is a diagram showing a configuration example of a peripheral resource (a processor and a permission configuration unit) included in the data processing apparatus according to the first embodiment.

FIG. 3 is a diagram showing a configuration example of the peripheral resource 12, that is, a configuration example of the processor 13 and the permission configuration unit 14. As shown in FIG. 3, the permission configuration unit 14 includes permission configuration units 0 to i−1 that respectively correspond to the processors 0 to i−1. Each of the permission configuration units 0 to i−1 stores permission configuration information in which an SPID table configuration TID (Table IDentification) (the details will be described later) to be used for access control and access permission configuration information (MID permission configuration) (MID: Middle IDentification) are associated with each other.

That is, the permission configuration unit 0 sets accessibility of the CPU 10 to the processor 0 and the permission configuration unit 0 and the processor 0 configure the entry 0. The permission configuration unit 1 sets accessibility of the CPU 10 to the processor 1 and the permission configuration unit 1 and the processor 1 configure the entry 1. As described above, the respective permission configuration units 0 to i−1 set accessibility of the CPU 10 to the respective processors 0 to i−1 and the respective permission configuration units 0 to i−1 and the respective processors 0 to i−1 configure the entries 0 to i−1.

As shown in FIG. 2, the permission configuration unit 14 outputs the SPID table configuration and the MID permission configuration to the access controller 11. Specifically, the permission configuration unit 14 outputs the SPID table configuration to the TID selection unit 22 of the access controller 11 and outputs the MID permission configuration to the MID permission configuration selection unit 21 of the access controller 11.

The MID permission configuration selection unit 21 of the access controller 11 selects the MID permission configuration to be used for the access control from among the MID permission configurations supplied from the permission configuration unit 14 using the processor selection information output from the CPU 10 and outputs the selected MID permission configuration to the permission determination unit 26.

Figure 4:
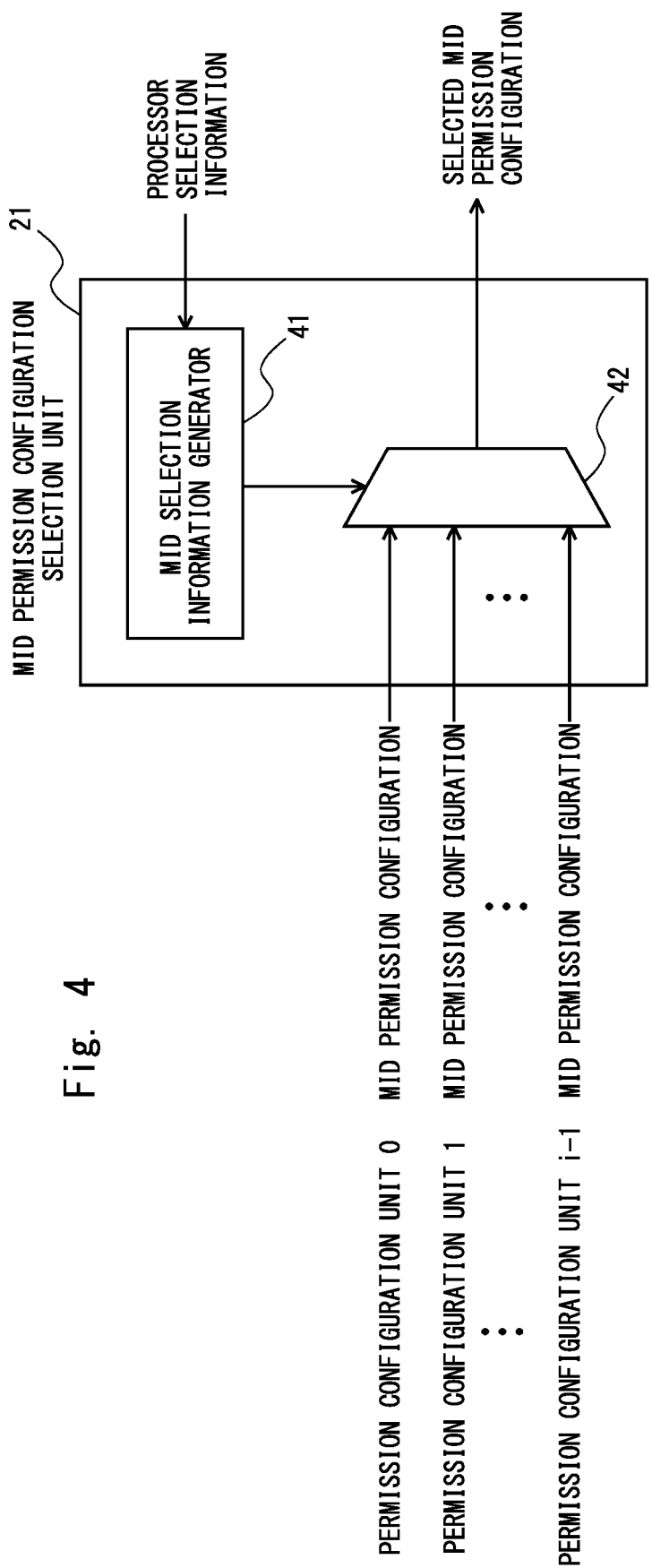
FIG. 4 is a diagram showing a configuration example of an MID permission configuration selection unit included in the data processing apparatus according to the first embodiment.

FIG. 4 is a diagram showing a configuration example of the MID permission configuration selection unit 21. As shown in FIG. 4, the MID permission configuration selection unit 21 includes an MID selection information generator 41 and a selector 42. The MID selection information generator 41 generates a selection signal in accordance with the processor selection information output from the CPU 10 and outputs the generated selection signal to the selector 42. The selector 42 selects the MID permission configuration in accordance with the selection signal from among the MID permission configurations supplied from the permission configuration unit 14 and outputs the selected MID permission configuration.

The processor selection information is, for example, access addresses of the processors 0 to i−1 that the CPU 10 access and the MID permission configuration selection unit 21 is able to recognize the processors 0 to i−1 that the CPU 10 accesses using this access address. Accordingly, the map permission configuration selection unit 21 is able to select the MID permission configurations 0 to i−1 that correspond to the processors 0 to i−1 that the CPU 10 accesses.

The TID selection unit 22 shown in FIG. 2 selects the SPID table configuration (TID) to be used for the access control from the SPID table configurations (TIDs) supplied from the permission configuration unit 14 using the processor selection information output from the CPU 10 and outputs the selected SPID table configuration (TID) to the SPID table selection unit 24.

Figure 5:
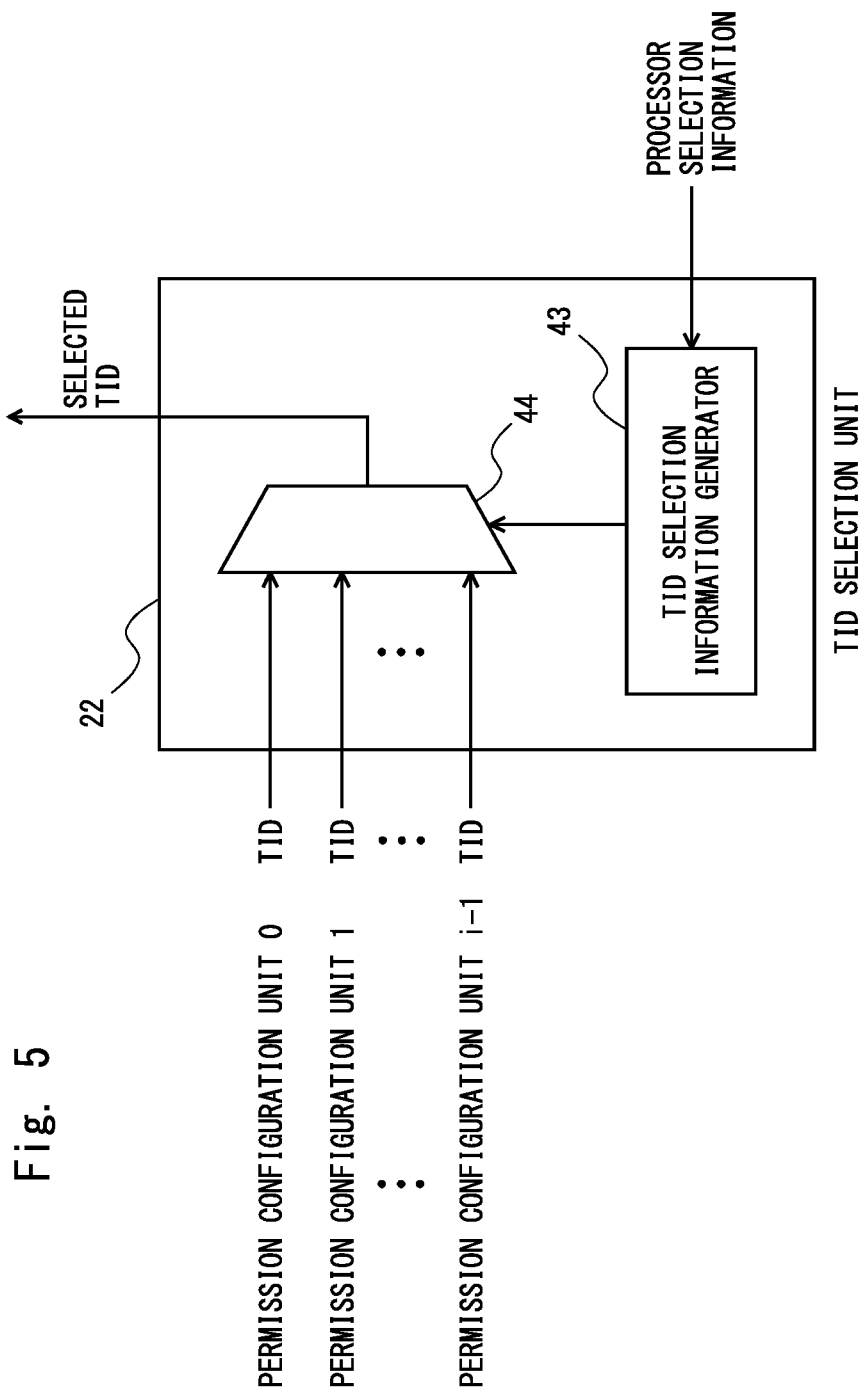
FIG. 5 is a diagram showing a configuration example of a TID selection unit included in the data processing apparatus according to the first embodiment.

FIG. 5 is a diagram showing a configuration example of the TID selection unit 22. As shown in FIG. 5, the TID selection unit 22 includes a TID selection information generator 43 and a selector 44. The TID selection information generator 43 generates a selection signal in accordance with the processor selection information output from the CPU 10 and outputs the generated selection signal to the selector 44. The selector 44 selects the SPID table configuration (TID) in accordance with the selection signal from among the SPID table configurations (TIDs) supplied from the permission configuration unit 14 and outputs the selected SPID table configuration (TID).

The processor selection information is, for example, the access addresses of the processors 0 to i−1 that the CPU 10 accesses and the TID selection unit 22 is able to recognize the processors 0 to i−1 that the CPU 10 accesses using this access address. Accordingly, the TID selection unit 22 is able to select the SPID table configurations (TIDs) that correspond to the processors 0 to i−1 that the CPU 10 accesses.

Figure 6:
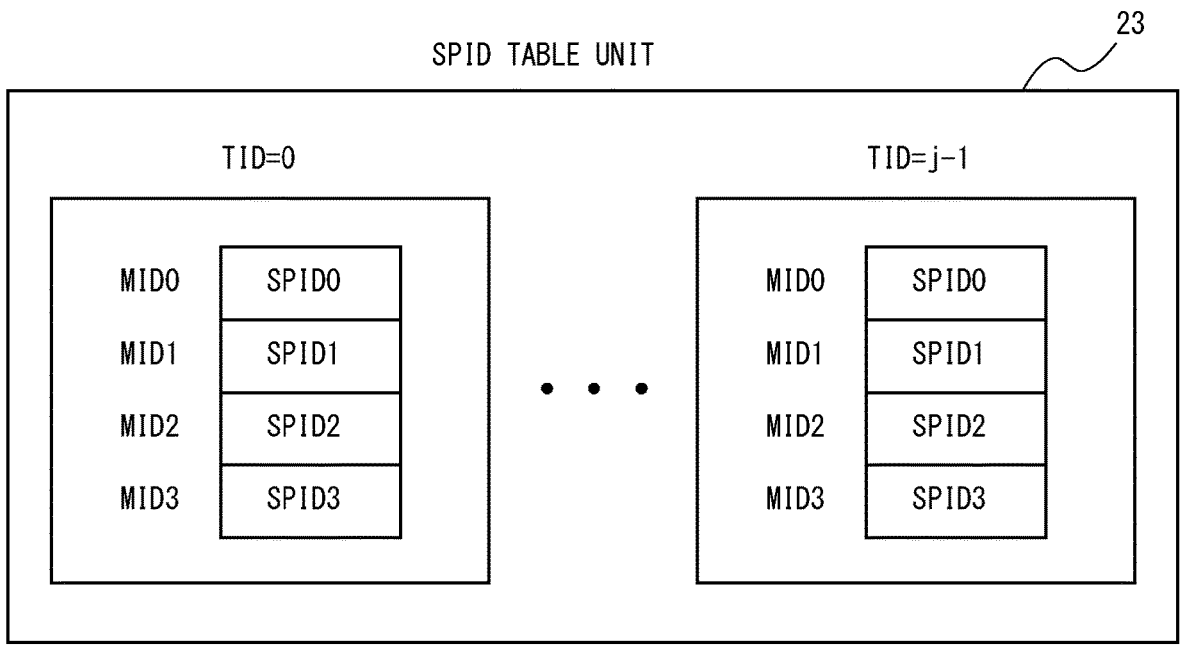
FIG. 6 is a diagram showing a configuration example of an SPID table unit included in the data processing apparatus according to the first embodiment.

The SPID table unit 23 shown in FIG. 2 includes SPID tables in which the MIDs and the SPIDs are associated with each other. FIG. 6 is a diagram showing a configuration example of the SPID table unit 23. As shown in FIG. 6, the SPID table unit 23 includes SPID tables (TID=0 to TID=j−1) (j is an integer equal to one or larger). In the example shown in FIG. 6, each of the SPID tables (TID=0 to TID=j−1) stores four MID0-MID3 and four SPID0-SPID3 associated with each other. In the SPID table shown in FIG. 6, when SPID0 is configured in MID0, this means that the MID permission configuration of MID0 is applied to the access of SPID0.

The SPID table selection unit 24 shown in FIG. 2 selects the SPID table to be used for the access control from among the SPID tables (TID=0 to TID=j−1) stored in the SPID table unit 23 using the SPID table configuration (TID) selected by the TID selection unit 22 and outputs the selected SPID table to the MID coincidence determination unit 25.

Figure 7:
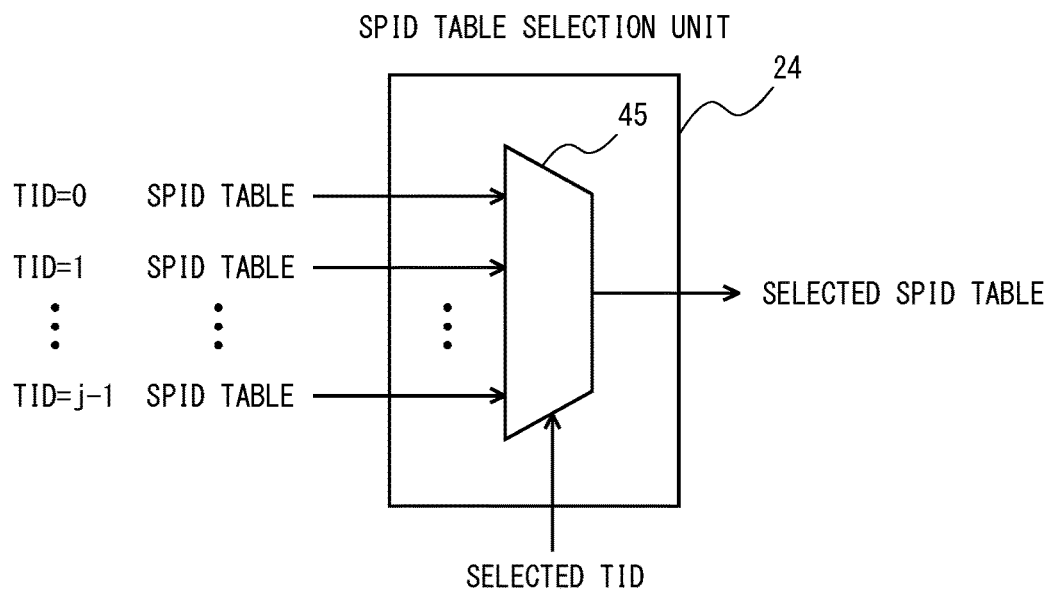
FIG. 7 is a diagram showing a configuration example of an SPID table selection unit included in the data processing apparatus according to the first embodiment.

FIG. 7 is a diagram showing a configuration example of the SPID table selection unit 24. As shown in FIG. 7, the SPID table selection unit 24 is composed using a selector 45. The selector 45 selects the SPID table in accordance with the SPID table configuration (TID) supplied from the TID selection unit 22 from among the SPID tables (TID=0 to TID=j−1) stored in the SPID table unit 23 and outputs the selected SPID table.

The MID coincidence determination unit 25 shown in FIG. 2 determines the MID that corresponds to the SPID output from the CPU 10 using the SPID table selected in the SPID table selection unit 24.

Figure 8:
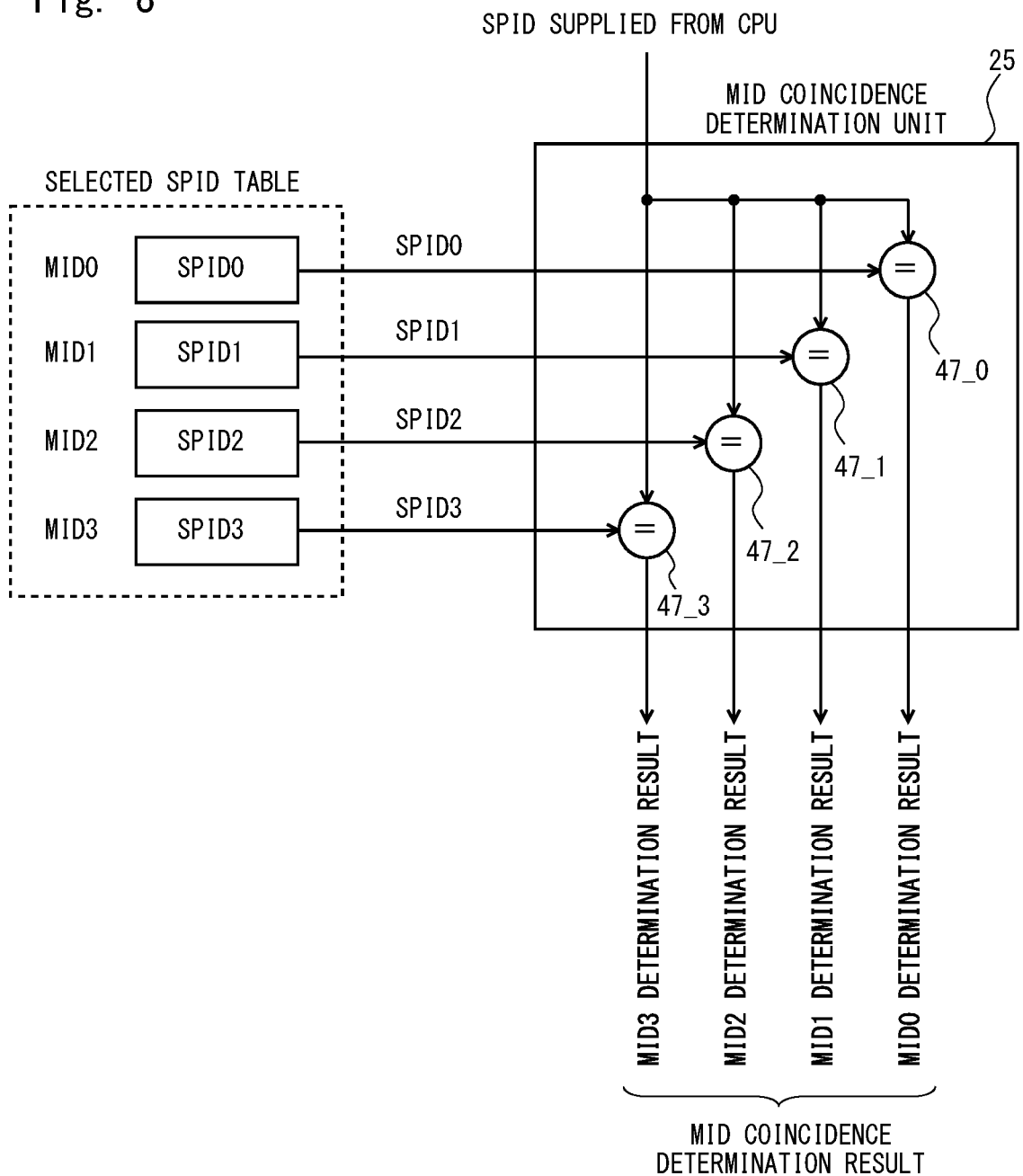
FIG. 8 is a diagram showing a configuration example of an MID coincidence determination unit included in the data processing apparatus according to the first embodiment.

FIG. 8 is a diagram showing a configuration example of the MID coincidence determination unit 25. As shown in FIG. 8, the MID coincidence determination unit 25 includes operators 47_0-47_3. The operators 47_0-47_3 are respectively supplied with the values (SPID0-SPID3) configured in MID0-MID3 in the selected SPID table. Further, the SPID is supplied to each of the operators 47_0-47_3 from the CPU 10. The operators 47_0-47_3 respectively compare the SPID supplied from the CPU 10 with the values configured in MID0-MID3 (SPID0-SPID3). When these values coincide with the SPID, it is determined that the request is the access request that corresponds to MID.

When, for example, the SPID supplied from the CPU 10 coincides with the value configured in MID0 of the SPID table (SPID0), the operator determines that the request is the access request that corresponds to MID0. In this case, the MID coincidence determination unit 25 outputs the result of the determination indicating that coincidence of MID0.

As described above, the MID coincidence determination unit 25 determines whether the SPID0-SPID3 supplied from the SPID table coincides with the SPID supplied from the CPU 10 and outputs the result of the determination to the permission determination unit 26.

The permission determination unit 26 shown in FIG. 2 determines accessibility of the CPU 10 to the processor 13 based on the MID permission configuration selected in the MID permission configuration selection unit 21, the MID coincidence determination result output from the MID coincidence determination unit 25, and the access information (R/W) output from the CPU 10.

Figure 9:
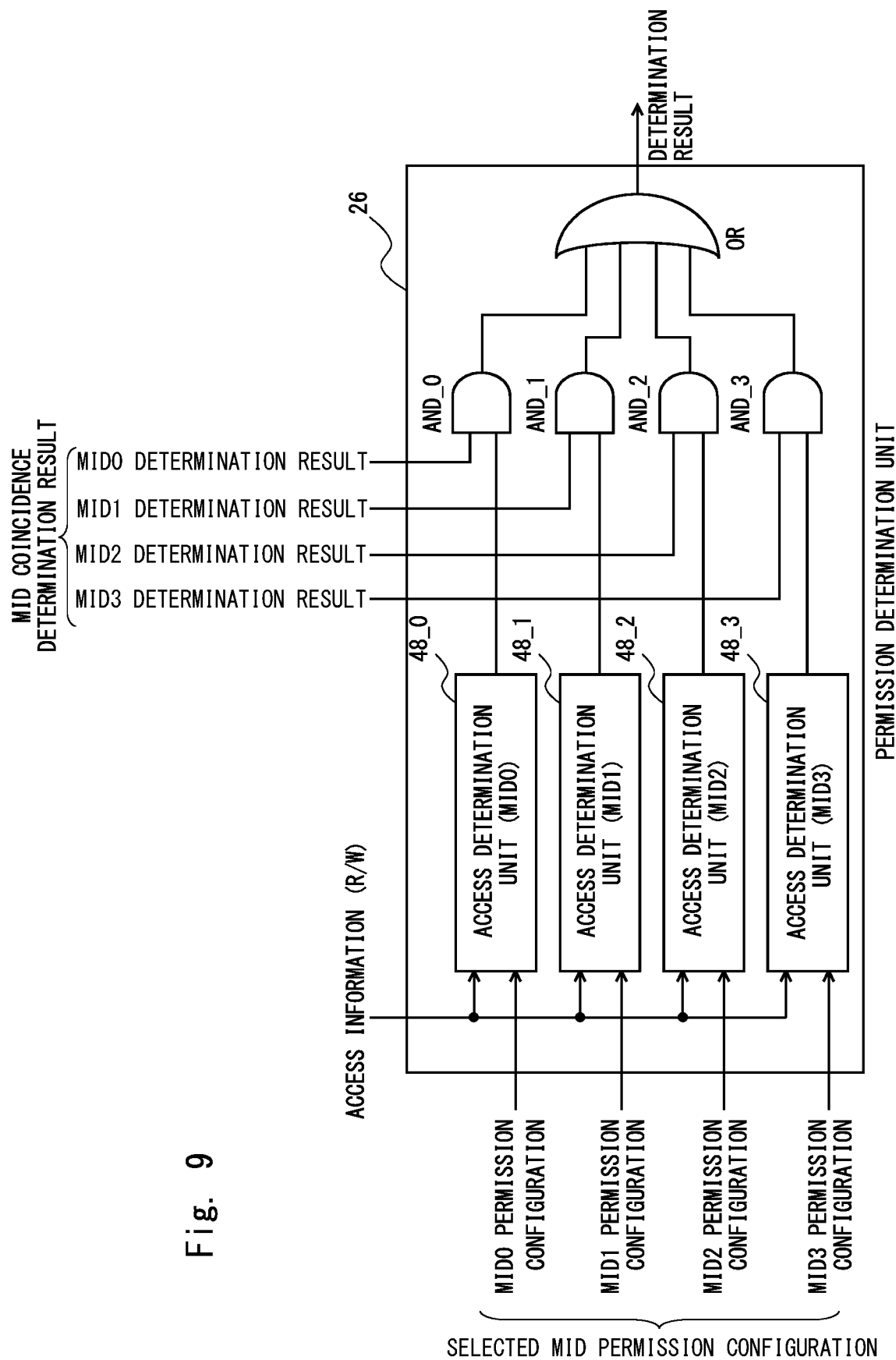
FIG. 9 is a diagram showing a configuration example of a permission determination unit included in the data processing apparatus according to the first embodiment.

FIG. 9 is a diagram showing a configuration example of the permission determination unit 26. The permission determination unit 26 shown in FIG. 9 includes access determination units 48_0-48_3, AND_0-AND_3, and an OR circuit. In the permission determination unit 26 shown in FIG. 9, first, the access determination units 48_0-48_3 perform an access determination.

The access determination units 48_0-48_3 are supplied with the access information (R/W) from the CPU 10. Further, the access determination units 48_0-48_3 are respectively supplied with MID0 permission configuration-MID3 permission configuration. The MID0 permission configuration-MID3 permission configuration are permission configuration with respect to the MID0-MID3 and are configured, for example, such that "MID0 indicates read permitted/write not permitted", "MID1 indicates read permitted/write permitted", "MID2 indicates read not permitted/write permitted", "MID3 indicates read not permitted/write not permitted".

In the aforementioned configuration, when, for example, the read (R) access is supplied from the CPU 10 as the access information (R/W), the access determination units 48_0 and 48_1 that correspond to the MID0 permission configuration and MID1 permission configuration configured to be "read permitted" among the access determination units 48_0-48_3 output a permission determination and the access determination units 48_2 and 48_3 that correspond to the MID2 permission configuration and MID3 permission configuration configured to be "read not permitted" output a non-permission determination.

After the access determination in the access determination units 48_0-48_3, the access determination based on the MID coincidence determination result is performed. That is, AND_0-AND_3 are respectively supplied with the results of the MID coincidence determination of MID0-MID3 from the MID coincidence determination unit 25. Further, AND_0-AND_3 are respectively supplied with the results of the access determination from the access determination units 48_0-48_3.

AND_0-AND_3 respectively determine that the access should be permitted when the access determination results supplied from the access determination units 48_0-48_3 indicate "permission determination" and the MID coincidence determination result supplied from the MID coincidence determination unit 25 indicates "coincidence". On the other hand, AND_0-AND_3 respectively determine that the access should not be permitted when the access determination results supplied from the access determination units 48_0-48_3 indicate "non-permission determination" or the MID coincidence determination result supplied from the MID coincidence determination unit 25 indicates "incoincidence".

The results of the determination output from AND_0-AND_3 are supplied to the OR circuit. The OR circuit outputs, when at least one of AND_0 to AND_3 determines that the access should be permitted, the result of the determination "access permitted". On the other hand, the OR circuit outputs, when all of AND_0-AND_3 determine that the access should not be permitted, the result of the determination "access not permitted".

In the permission determination unit 26 shown in FIG. 9, the case in which the access determination units 48_0-48_3 first perform the access determination and after that perform the access determination based on the MID coincidence determination result has been described. However, the data processing apparatus 1 according to this embodiment may perform the access determination in the access determination units 48_0-48_3 after performing the access determination based on the MID coincidence determination result.

In the permission determination unit 26 shown in FIG. 9, the case in which the access determination units 48_0-48_3 perform the access determination using read/write (R/W) as the access information output from the CPU 10 has been described. However, the data processing apparatus 1 according to this embodiment may be configured in such a way that the access determination units 48_0-48_3 perform the access determination using another access information (e.g., CPU number).

Next, operations of the access control of the data processing apparatus 1 according to this embodiment will be described with reference to the block diagram shown in FIG. 2 and the flowchart shown in FIG. 10.

As shown in FIG. 2, when accessing the peripheral resource 12, the CPU 10 outputs the processor selection information, the SPID, and the access information (R/W) to the access controller 11. The MID permission configuration selection unit 21 selects the MID permission configuration to be used for the access control from among the MID permission configurations supplied from the permission configuration unit 14 using the processor selection information output from the CPU 10 and outputs the selected MID permission configuration to the permission determination unit 26 (Step S1 in FIG. 10). Further, the TID selection unit 22 selects the SPID table configuration (TID) to be used for the access control from among the SPID table configurations (TIDs) supplied from the permission configuration unit 14 using the processor selection information output from the CPU 10 and outputs the selected SPID table configuration (TID) to the SPID table selection unit 24 (Step S2 in FIG. 10).

Figure 10:
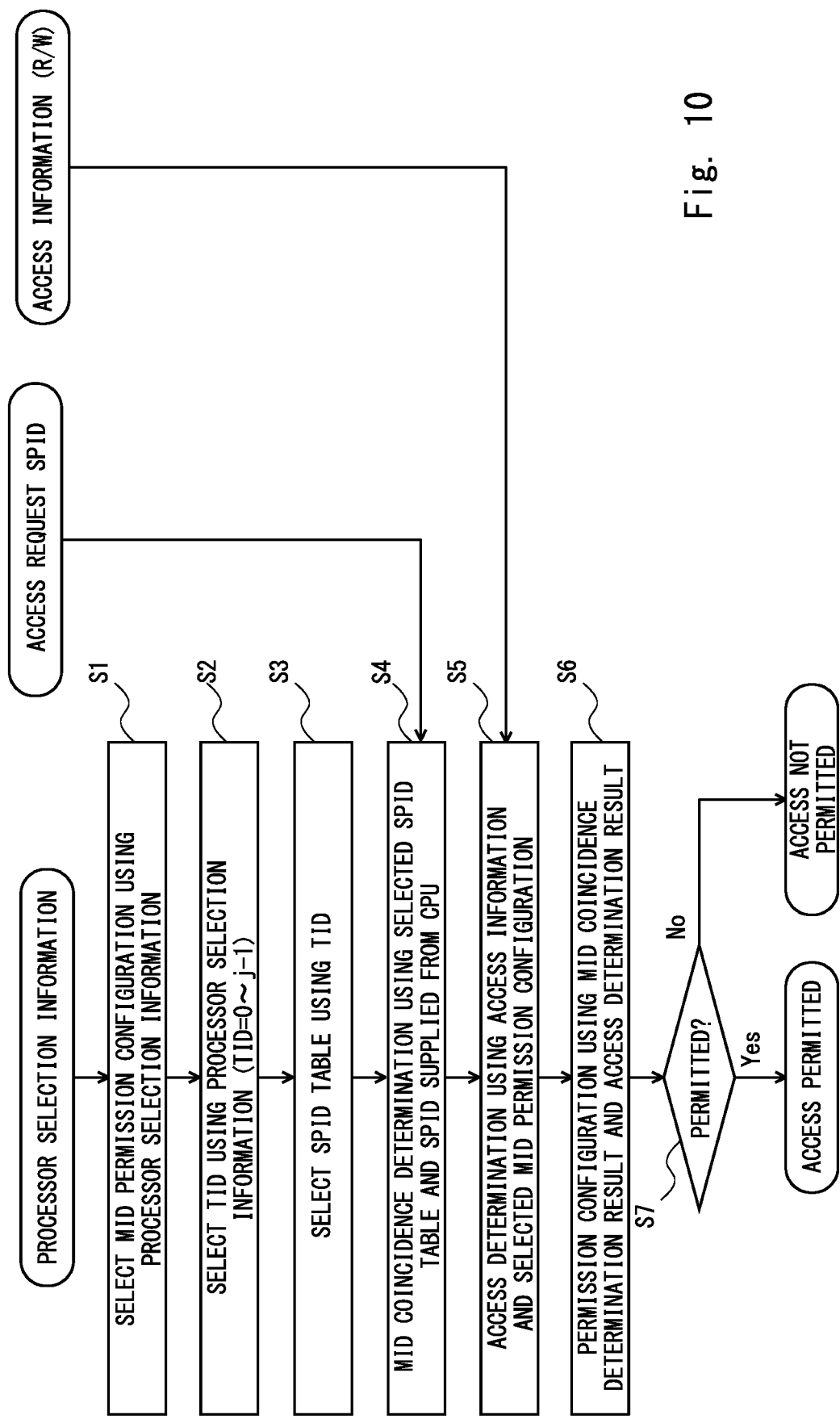
FIG. 10 is a flowchart for describing an operation of an access control of the data processing apparatus according to the first embodiment.

After that, the SPID table selection unit 24 shown in FIG. 2 selects the SPID table to be used for the access control from among the SPID tables (TID=0 to TID=j−1) stored in the SPID table unit 23 using the SPID table configuration (TID) selected by the TID selection unit 22 and outputs the selected SPID table to the MID coincidence determination unit 25 (Step S3 in FIG. 10).

After that, the MID coincidence determination unit 25 shown in FIG. 2 determines the MID that corresponds to the SPID output from the CPU 10 using the SPID table selected in the SPID table selection unit 24 (Step S4 in FIG. 10). Specifically, as shown in FIG. 8, the MID coincidence determination unit 25 compares the SPID supplied from the CPU 10 with the values configured in the respective MID0-MID3 (SPID0-SPID3) and outputs MID0-MID3 that correspond to SPID0-SPID3 that have coincided with the SPID supplied from the CPU 10 to the permission determination unit 26.

After that, the permission determination unit 26 shown in FIG. 2 determines accessibility of the CPU 10 to the processor 13 based on the MID permission configuration selected in the MID permission configuration selection unit 21, the MID coincidence determination result output from the MID coincidence determination unit 25, and the access information (R/W) output from the CPU 10.

Specifically, the access determination units 48_0-48_3 included in the permission determination unit 26 shown in FIG. 9 perform the access determination using the access information (R/W) output from the CPU 10 and the MID permission configuration selected in Step S1 in FIG. 10 (MID0 permission configuration-MID3 permission configuration) (Step S5 in FIG. 10).

After that, AND_0-AND_3 and the OR circuit included in the permission determination unit 26 shown in FIG. 9 perform the permission determination using the MID coincidence determination result supplied from the MID coincidence determination unit 25 and the access determination results supplied from the access determination units 48_0-48_3 (Step S6 in FIG. 10).

When at least one of AND_0 to AND_3 determines that the access should be permitted (Step S7: Yes), the permission determination unit 26 outputs the result of the determination "access permitted". On the other hand, when all the AND_0-AND_3 determine that the access should not be permitted" (Step S7: No), the permission determination unit 26 outputs the result of the determination "access not permitted".

According to these operations, when the CPU 10 accesses the processor 13, the access controller 11 is able to control the access by the CPU 10 to the processor 13. In other words, the access controller 11 is able to protect the processor 13 from unauthorized access by the CPU 10 when the CPU 10 accesses the processor 13.

Next, a specific example of the access control in the data processing apparatus 1 according to this embodiment will be described.

Figure 11:
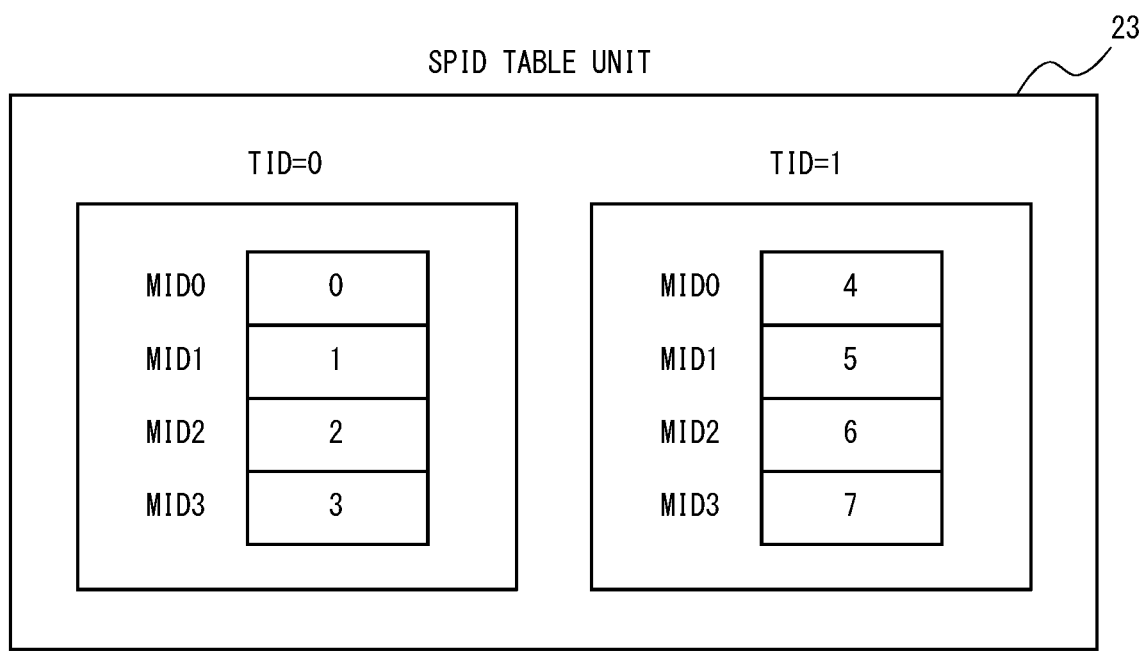
FIG. 11 is a diagram showing a specific example of the SPID table unit included in the data processing apparatus according to the first embodiment.

FIG. 11 is a diagram showing a specific example of the SPID table unit 23. As shown in FIG. 11, the SPID table unit 23 includes two SPID tables (TID=0, 1). In the SPID table (TID=0), MID0=SPID"0", MID1=SPID"1", MID2=SPID"2", and MID3=SPID"3" are configured. Further, in the SPID table (TID=1), MID0=SPID"4", MID1=SPID"5", MID2=SPID"6", and MID3=SPID"7" are configured.

Figure 12:
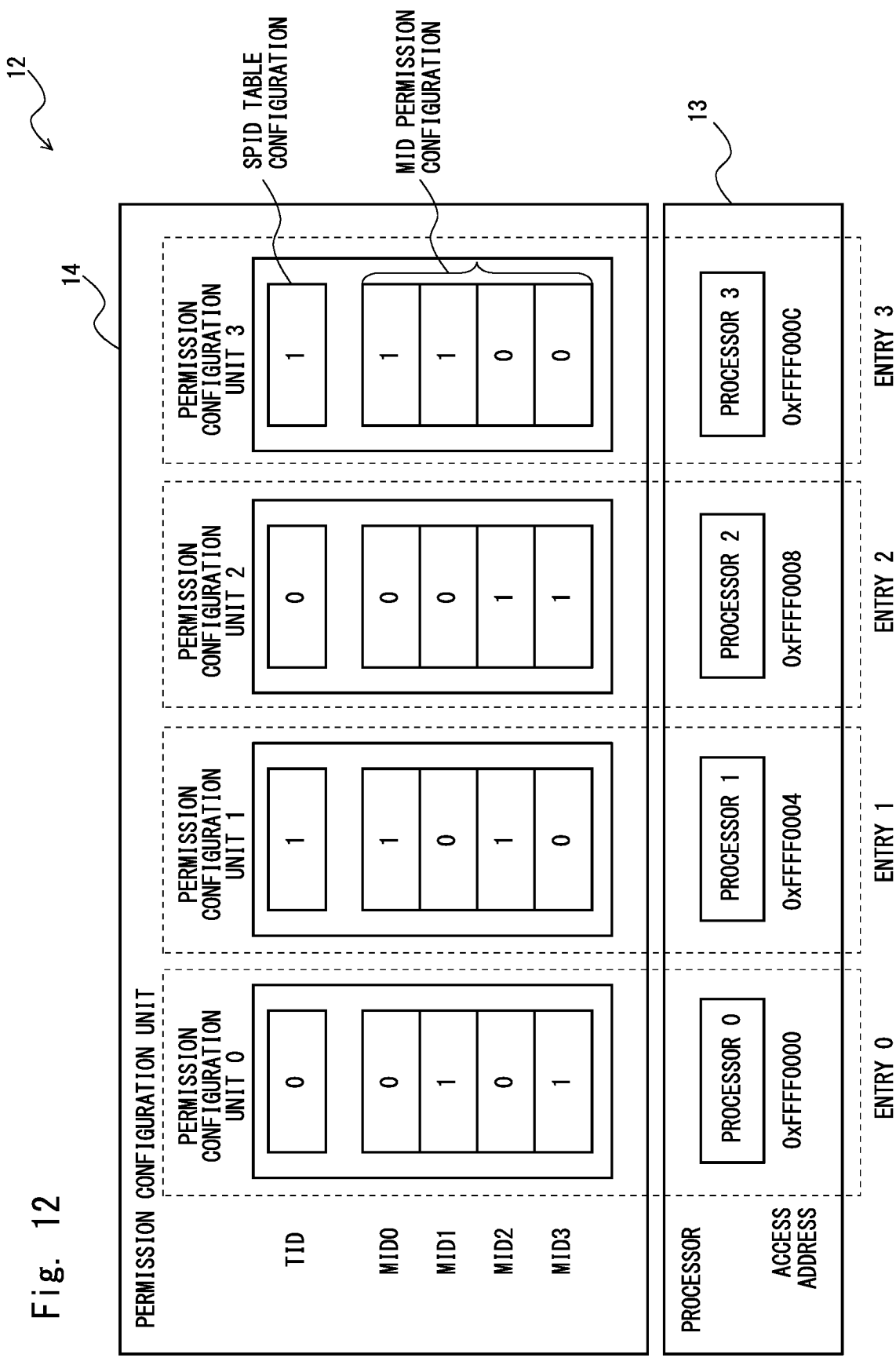
FIG. 12 is a diagram showing a specific example of the peripheral resource (the processor and the permission configuration unit) included in the data processing apparatus according to the first embodiment.

FIG. 12 is a diagram showing a specific example of the peripheral resource 12, that is, a specific example of the processor 13 and the permission configuration unit 14. FIG. 12 shows an example in which the peripheral resource 12 includes four processors 0-3. Access addresses are set in the respective processors 0-3. Specifically, an access address "0xFFFF0000" is set in the processor 0, an access address "0xFFFF0004" is set in the processor 1, an access address "0xFFFF0008" is set in the processor 2, and an access address "0xFFFF000C" is set in the processor 3.

Further, the permission configuration unit 14 is provided with permission configuration units 0-3 that respectively correspond to the processors 0-3. The SPID table configuration (TID) and the MID permission configuration are configured in each of the permission configuration units 0-3. Specifically, in the permission configuration unit 0, TID=0, MID0=0, MID1=1, MID2=0, and MID3=1 are set. When the MID permission configuration is "0", it indicates "access not permitted". When the map permission configuration is "1", it indicates "access permitted". Further, TID=1, MID0=1, MID1=0, MID2=1, and MID3=0 are configured in the permission configuration unit 1. TID=0, MID0=0, MID1=0, MID2=1, and MID3=1 are configured in the permission configuration unit 2. TID=1, MID0=1, MID1=1, MID2=0, and MID3=0 are configured in the permission configuration unit 3.

Based on the aforementioned configurations, an operation when the CPU accesses the peripheral resource 12 (i.e., the processor 2) using the access address "0xFFFF0008" as the processor selection information and "SPID=2" as the access request SPID will be described with reference to the flowchart shown in FIG. 13.

As shown in FIG. 2, the CPU 10 outputs the access address "0xFFFF0008" as the processor selection information when accessing the peripheral resource 12. As shown in FIG. 12, the access address "0xFFFF0008" corresponds to the access address of the processor 2 (n=2). Therefore, the MID permission configuration selection unit 21 selects the MID permission configuration of the permission configuration unit 2 and outputs the selected MID permission configuration to the permission determination unit 26 (Step S1 in FIG. 13). Further, the TID selection unit 22 selects the SPID table configuration (TID=0) of the permission configuration unit 2 and outputs the selected SPID table configuration (TID=0) to the SPID table selection unit 24 (Step S2 in FIG. 13).

Figure 13:
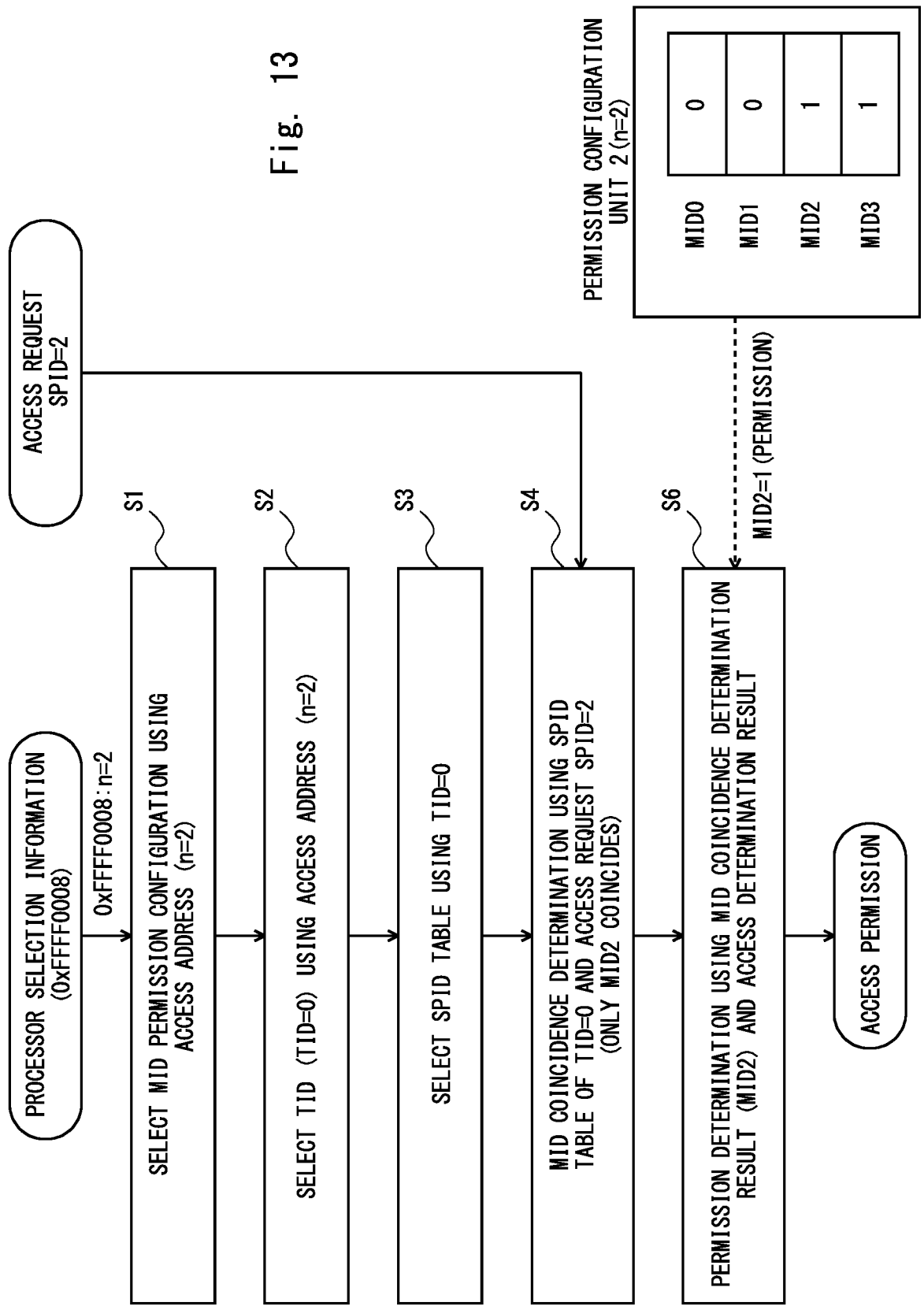
FIG. 13 is a flowchart for describing a specific example of the access control of the data processing apparatus according to the first embodiment.

After that, the SPID table selection unit 24 shown in FIG. 2 selects the SPID table to be used for the access control (TID=0) from among the SPID tables (TID=0, TID=1) stored in the SPID table unit 23 using the SPID table configuration (TID=0) selected in the TID selection unit 22 and outputs the selected SPID table (TID=0) to the MID coincidence determination unit 25 (Step S3 in FIG. 13).

After that, the MID coincidence determination unit 25 shown in FIG. 2 determines the MID that corresponds to SPID=2 output from the CPU 10 using the SPID table (TID=0) selected in the SPID table selection unit 24 (Step S4 in FIG. 13). In this case, since the SPID configured in MID2 the SPID table (TID=0) is "2", "MID2" is output to the permission determination unit 26 as the MID that corresponds to SPID=2 output from the CPU 10.

After that, the permission determination unit 26 shown in FIG. 2 determines accessibility of the CPU 10 to the processor 13 based on the MID permission configuration selected in the MID permission configuration select on unit 21 (n=2: see Step S1 in FIG. 13) and the MID coincidence determination result output from the MID coincidence determination unit 25 (MID2) (Step S6 in FIG. 13).

Specifically, the permission determination unit 26 refers to the configuration information (MID0=0, MID1=0, MID2=1, MID3=1) of the permission configuration unit 2 selected by the MID permission configuration selection unit 21 to acquire the configuration information (MID2=1) of the MID2 that corresponds to "MID2" output from the MID coincidence determination unit 25. In this case, MID2=1, which means "access permitted". Accordingly, the access by the CPU 10 to the processor 2 (access address "0xFFFF0008") is permitted.

In the example shown in FIG. 13, the access determination using the access information (R/W) output from the CPU 10 (Step S5 in FIG. 10) is omitted.

As described in Background, the data processing apparatus includes the access controller configured to control access to peripheral resources in order to protect the peripheral resources from unauthorized access when the operation unit accesses the peripheral resources. The access controller controls, for example, the access by the operation unit to each entry based on the permission configuration information indicating an agreement regarding whether the operation unit can access the respective entries (processors) that the peripheral resources include.

However, in recent data processing apparatuses, the number of entries of the peripheral resources tends to increase. This leads to problems that the volume of the permission configuration information regarding the agreement on access rights of the operation unit to the respective entries (processors) becomes too large and the size of the circuit that stores the permission configuration information also increases.

The data processing apparatus according to this embodiment is configured to output the access request identifier (SPID) to the access controller 11 when the CPU 10 accesses the processor 13. Further, the SPID tables (see FIG. 6) in which the intermediate identifiers (MIDs) and the access request Identifiers (SPIDs) are associated with each other are provided. Further, the permission configuration units 0 to i−1 in which permission configuration is performed for each intermediate identifier (MID) are provided (see FIG. 3).

When the CPU 10 accesses the processors 0 to i−1, the access controller 11 determines the intermediate identifier (MID) that corresponds to the access request identifier (SPID) output from the CPU 10 and determines whether to permit access based on the permission configuration that corresponds to this intermediate identifier (MID).

Note that the number of intermediate identifiers (MIDs) is smaller than the number of access request identifiers (SPIDs). Therefore, the size of the circuit of the permission configuration unit when the permission configuration is performed for each intermediate identifier (MID) can be made smaller than that when the permission configuration is performed for each access request identifier (SPID). Specifically, the size of the permission configuration units 0 to i−1 shown in FIG. 3 can be made small.

Therefore, according to the data processing apparatus in this embodiment, it is possible to provide the data processing apparatus and the access control method capable of suppressing the increase in the size of the circuit.

Figure 14:
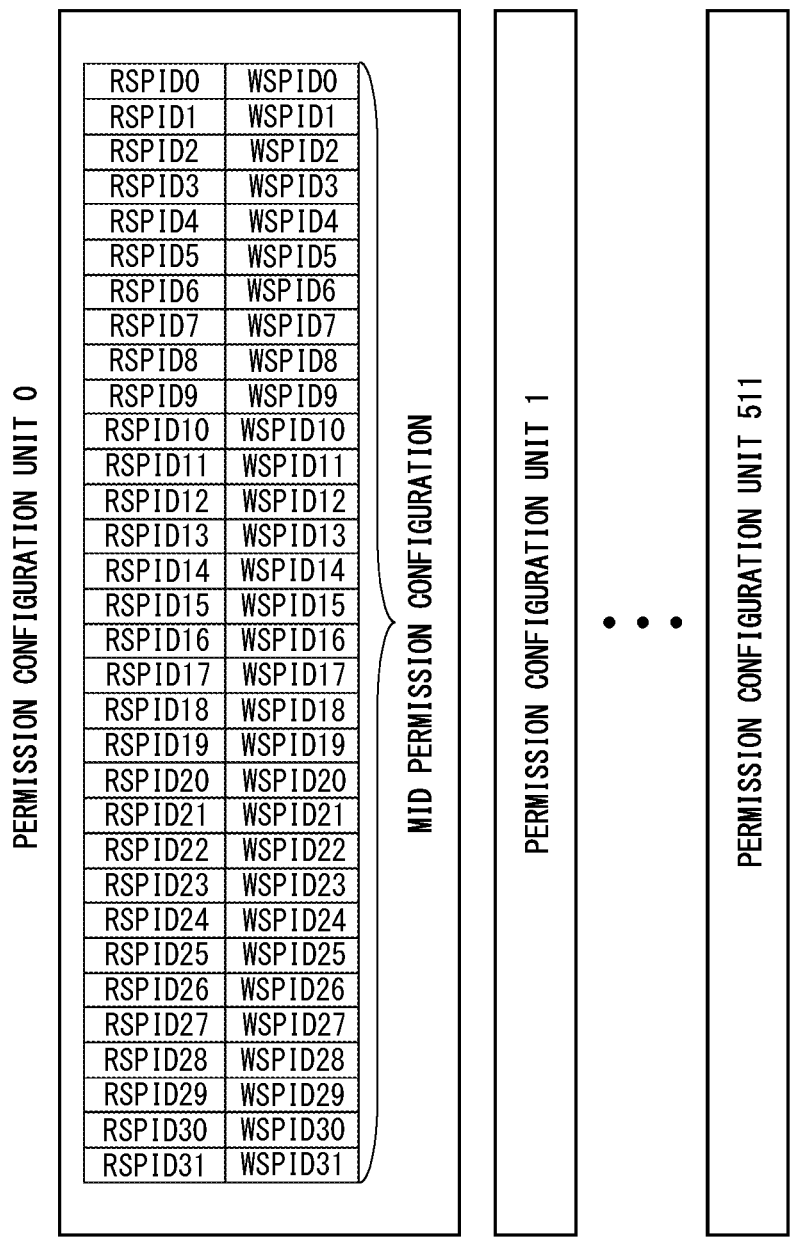
FIG. 14 is a diagram showing a configuration example of a permission configuration unit of a data processing apparatus according to a comparative example.

FIG. 14 is a diagram showing a configuration example of a permission configuration unit of a data processing apparatus according to a comparative example. In the comparative example shown in FIG. 14, permission configuration units 0-511 are provided for the peripheral resources whose number of entries is 512. When the SPID is 5 bits and the access permission configuration is performed for each of the reading and writing, as shown in FIG. 14, write permission configurations WSPID0-WSPID31 and read permission configurations RSPID0-RSPID31 are configured for each of SPID0-SPID31 in the permission configuration unit 0. In the comparative example shown in FIG. 14, these permission configuration units 0-511 are provided for all the peripheral resources whose number of entries is 512. Accordingly, the size of the circuit of the permission configuration units 0-511 becomes too large.

Figure 15:
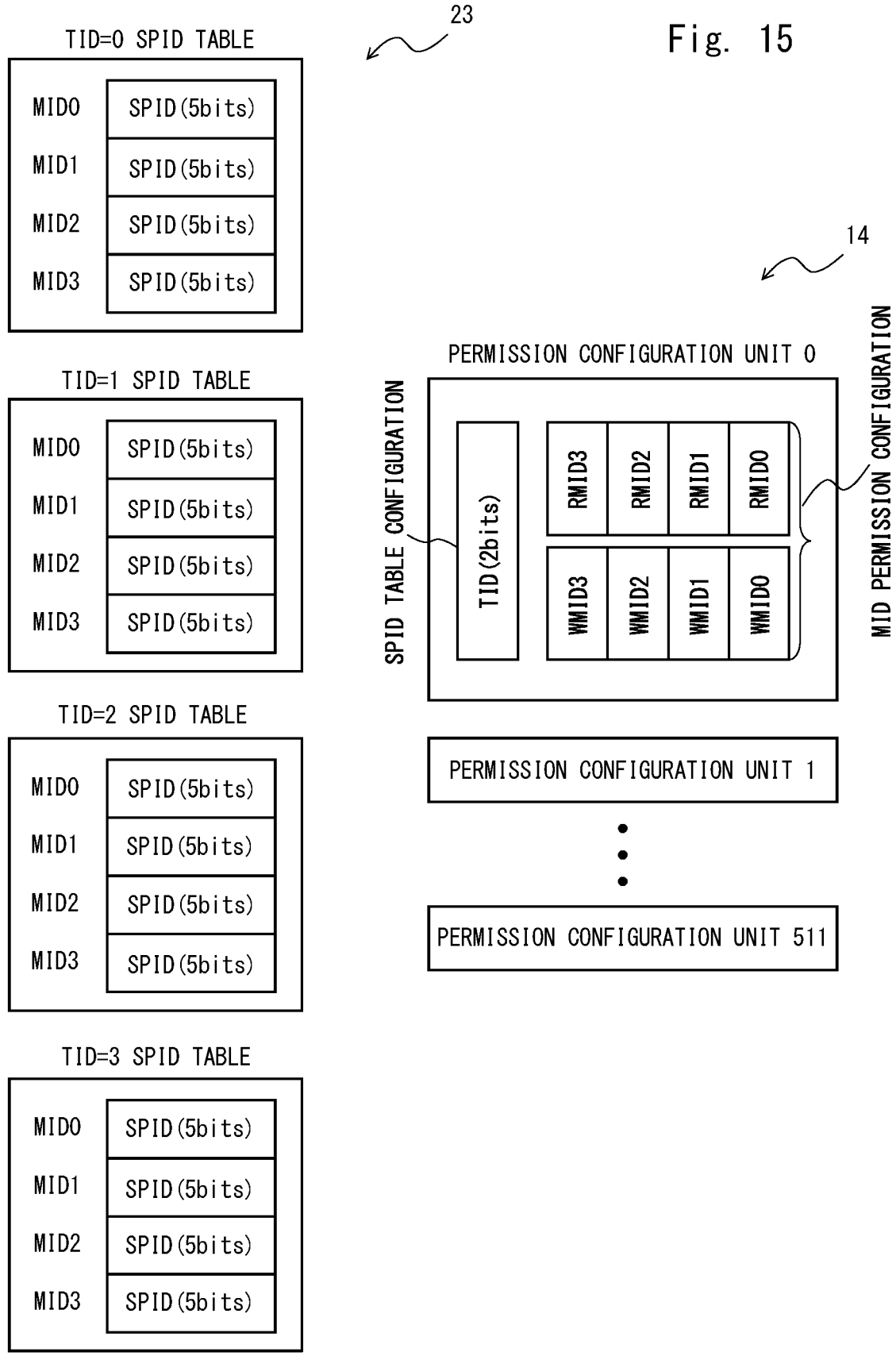
FIG. 15 is a diagram showing a configuration example of the SPID table unit and the permission configuration unit included in the data processing apparatus according to the first embodiment.

FIG. 15 is a diagram showing a configuration example of the SPID table unit 23 and the permission configuration unit 14 included in the data processing apparatus 1 according to this embodiment. In the configuration example shown in FIG. 15, four SPID tables (TID=0-3) are provided. Each of the SPID tables uses a 5-bit register for each MID so that MID0-MID3 are made associated with the respective SPIDs.

Further, in the configuration example shown in FIG. 15, the permission configuration units 0-511 are provided for the peripheral resources whose number of entries is 512. As shown in FIG. 15, write permission configurations WMID0-WMID3 and read permission configurations RMID0-RMID3 are configured for each of MID0-MID3 in the permission configuration unit 0. Further, the SPID table configuration (TID) is configured in the permission configuration unit 0. A 2-bit register is used for the SPID table configuration (TID). In the configuration example shown in FIG. 15, these permission configuration units 0-511 are provided for all the peripheral resources whose number of entries is 512.

Comparing the configuration according to the comparative example shown in FIG. 14 with the configuration of the data processing apparatus according to this embodiment shown in FIG. 15, in the configuration example according to this embodiment shown in FIG. 15, the total number of bits of the registers constituting the permission configuration units 0-511 can be greatly reduced compared to that of the comparative example shown in FIG. 14. Specifically, the total number of bits of the registers constituting the permission configuration units 0-511 according to the comparative example shown in FIG. 14 is 512 (the number of entries)×32 (the number of SPIDs)×2=32768 bits. On the other hand, the total number of bits of the registers constituting the permission configuration units 0-511 of the configuration example according to this embodiment shown in FIG. 15 is 512 (the number of entries)×{4 (the number of MIDs)×2+2 bits (TID)}=5120 bits. Accordingly, in the configuration example according to this embodiment shown in FIG. 15, the number of bits can be reduced by about 84% compared to that of the configuration according to the comparative example shown in FIG. 14.

In the configuration example according to this embodiment shown in FIG. 15, the SPID tables (TID=0-3) need to be newly prepared. However, the number of bits for constituting the four SPID tables is 5 bits×4 (the number of MIDs)×4 (the number of tables)=80 bits. Therefore, it is possible to constitute the SPID tables (TID=0-3) by a small number of bits. Accordingly, even when the total number of bits is taken into consideration, the number of bits used for the configuration can be reduced more in the configuration example according to this embodiment shown in FIG. 15.

Further, in this embodiment, compared to the case in which the permission configurations are provided for all the SPIDs as described in the comparative example, the number of SPIDs that can be used in each of the permission configuration units is limited. However, it is possible to increase the number of SPIDs that the peripheral resources can use compared to the number of SPID tables defined in the SPID table unit 23. Further, the number of programs that use the respective entries is limited in the practical applications. Therefore, there is no need to provide the permission configuration for all the SPIDs.

From this embodiment described above, it is possible to provide the data processing apparatus and the access control method capable of suppressing the increase in the size of the circuit.

Second Embodiment

Next, a second embodiment will be described.

Figure 16:
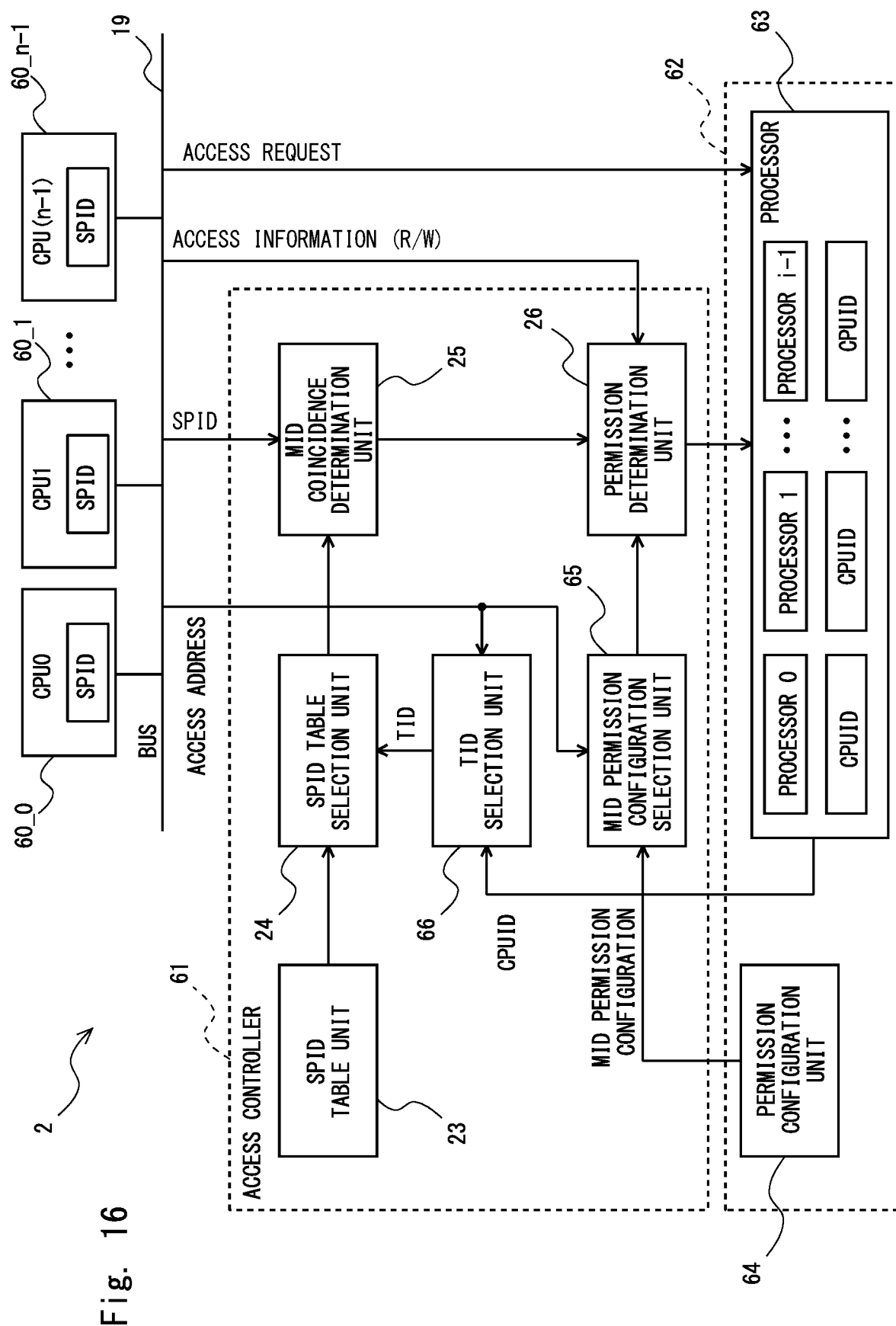
FIG. 16 is a block diagram showing a configuration example of a data processing apparatus according to a second embodiment.

FIG. 16 is a block diagram showing a configuration example of a data processing apparatus according to the second embodiment. A data processing apparatus 2 according to the second embodiment is different from the data processing apparatus 1 described in the first embodiment (see FIG. 2) in that a processor 63 has CPUIDs for configuring CPUs that use the respective processors 0 to i−1. Since the other configurations are similar to those of the data processing apparatus 1 described in the first embodiment (see FIG. 2), the same components are denoted by the same reference symbols and duplicated descriptions thereof will be omitted as appropriate.

As shown in FIG. 16, the data processing apparatus 2 according to this embodiment includes a plurality of CPUs 60_0 to 60_$n$−1, an access controller 61, and a peripheral resource 62. The access controller 61 includes an MID permission configuration selection unit 65, a TID selection unit 66, the SPID table unit 23, the SPID table selection unit 24, the MID coincidence determination unit 25, and the permission determination unit 26. Further, the peripheral resource 62 includes the processor 63 and a permission configuration unit 64.

The plurality of CPUs 60_0 to 60_$n$−1 are configured in such a way that they can access the peripheral resource 62 via the bus 19. In this case, the access controller 61 controls the access of the respective CPUs 60_0 to 60_$n$−1 to the peripheral resource 62.

Each of the CPUs 60_0 to 60_$n$−1 executes a predetermined program. Further, each of the CPUs 60_0 to 60_$n$−1 stores the access request identifier (SPID). Each of the CPUs 60_0 to 60_$n$−1 outputs the access address, the SPID, and the access information (R/W) to the access controller 61 when accessing the peripheral resource 62.

The processor 63 of the peripheral resource 62 is provided with processors 0 to i−1 (i is an integer equal to or larger than one). Each of the processors 0 to i−1 provides the main function (interruption processing etc.) of the peripheral resource 62. Further, the peripheral resource 62 includes the permission configuration unit 64.

Further, in this embodiment, the CPUIDs for configuring the CPUs that use the respective processors 0 to i−1 are provided. In this embodiment, n pieces of CPUs 60_0 to 60_$n$−1 are provided. Therefore, CPUID=0 to n−1 is configured as the CPUIDs. When, for example, CPUID=0 is configured as the CPUID that corresponds to the processor 0, this means that the CPU that uses the processor 0 is CPU0 (60_0). The CPUIDs that correspond to the respective processors 0 to i−1 can be arbitrarily configured by the user. The CPUIDs that correspond to the respective processors 0 to i−1 are output to the TID selection unit 66.

The permission configuration unit 64 includes, similar to the permission configuration unit 14 shown in FIG. 3, permission configuration units 0 to i−1 that correspond to the respective processors 0 to i−1. Each of the permission configuration units 0 to i−1 stores the access permission configuration information (MID permission configuration) configured for each intermediate identifier (MID). In this embodiment, the TID selection unit 66 selects the SPID table configuration (TID) using the CPUIDs that correspond to the respective processors 0 to i−1. Accordingly, in this embodiment, the permission configuration unit 64 does not include the SPID table configuration (TID) included in the permission configuration unit 14 shown in FIG. 3.

As shown in FIG. 16, the permission configuration unit 64 outputs the MID permission configuration to the MID permission configuration selection unit 65. The MID permission configuration selection unit 65 selects the MID permission configuration to be used for the access control from among the MID permission configurations supplied from the permission configuration unit 64 using the access addresses output from the CPUs 60_0 to 60_$n$−1 and outputs the selected MID permission configuration to the permission determination unit 26.

Figure 17:
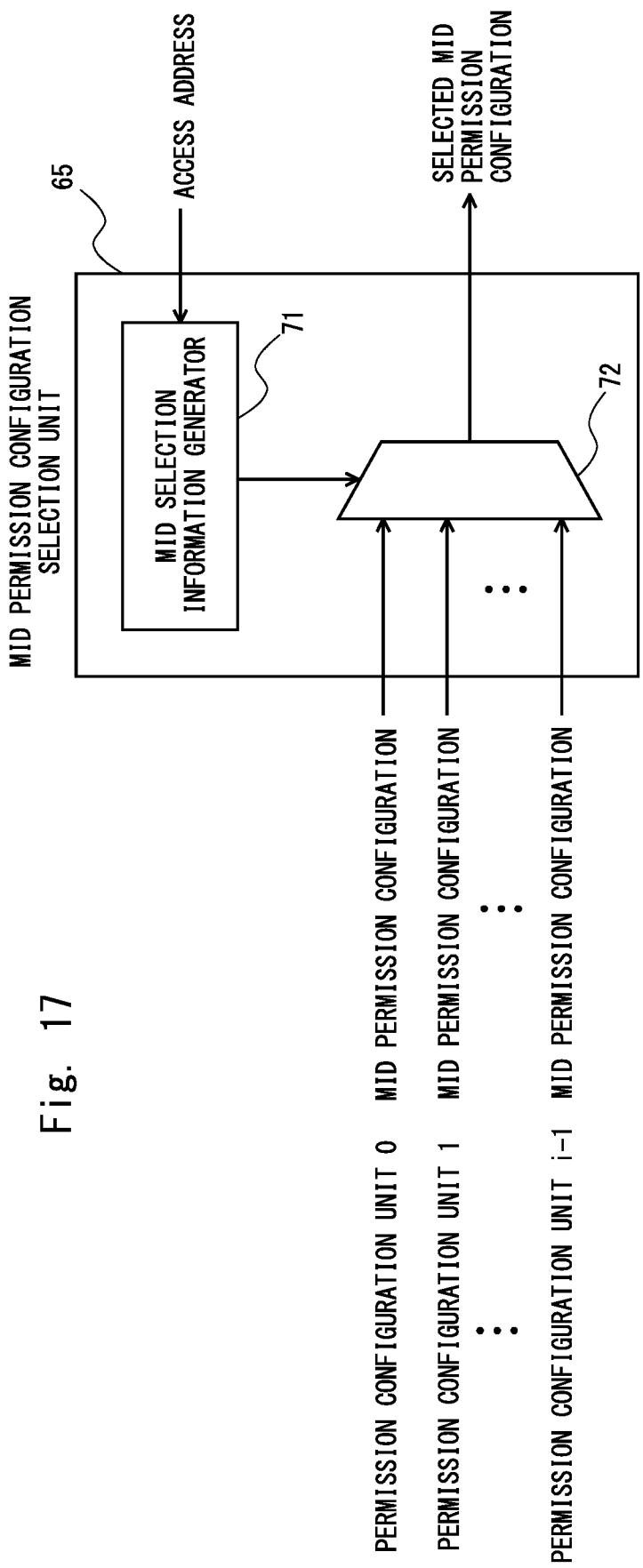
FIG. 17 is a diagram showing a configuration example of an MID permission configuration selection unit included in the data processing apparatus according to the second embodiment.

FIG. 17 is a diagram showing a configuration example of the MID permission configuration selection unit 65. As shown in FIG. 17, the MID permission configuration selection unit 65 includes an MID selection information generator 71 and a selector 72. The MID selection information generator 71 generates a selection signal in accordance with the access addresses output from the CPUs 60_0 to 60_$n$−1 and outputs the generated selection signal to the selector 72. The selector 72 selects the MID permission configuration in accordance with the selection signal from among the MID permission configurations supplied from the permission configuration unit 64 and outputs the selected MID permission configuration.

The access addresses output from the CPUs 60_0 to 60_$n$−1 are access addresses of the processors 0 to i−1 that the CPUs 60_0 to 60_$n$−1 access and the MID permission configuration selection unit 65 is able to recognize the processors 0 to i−1 that the CPUs 60_0 to 60_$n$−1 access using these access addresses. Accordingly, the MID permission configuration selection unit 65 is able to select the MID permission configurations 0 to i−1 that correspond to the processors 0 to i−1 that the CPUs 60_0 to 60_$n$−1 access.

The TID selection unit 66 shown in FIG. 16 selects the CPUID that corresponds to the access address from among the CPUIDs that correspond to the respective processors 0 to i−1 supplied from the peripheral resource 62 using the access addresses output from the CPUs 60_0 to 60_$n$−1.

Figure 18:
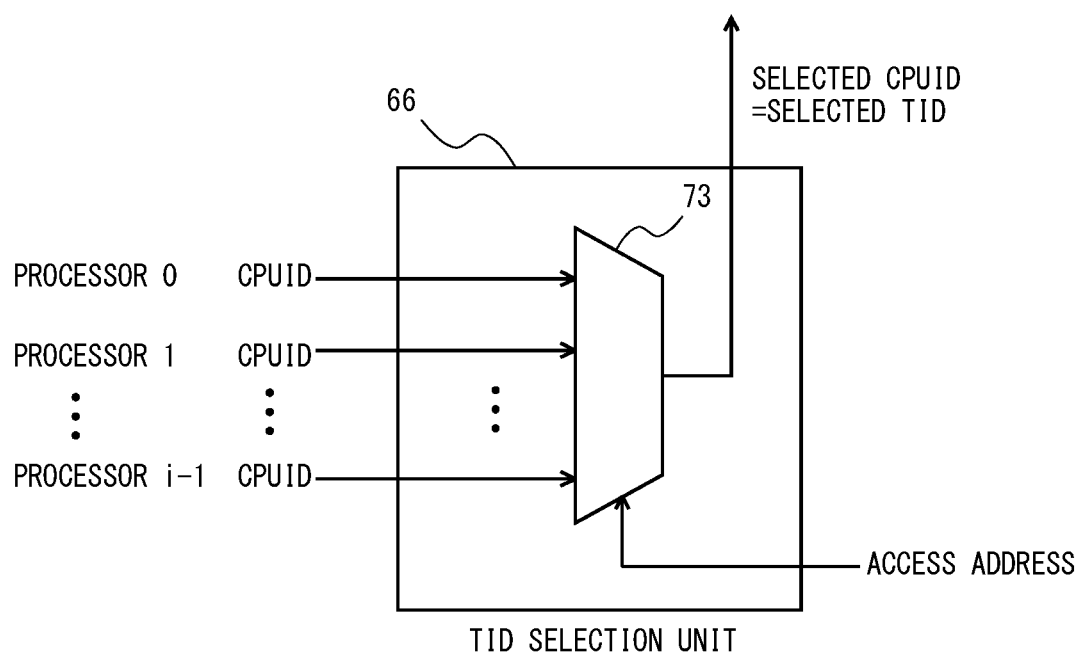
FIG. 18 is a diagram showing a configuration example of a TID selection unit included in the data processing apparatus according to the second embodiment.

FIG. 18 is a diagram showing a configuration example of the TID selection unit 66. As shown in FIG. 18, the TID selection unit 66 includes a selector 73. The selector 73 selects the CPUID that corresponds to the access address from among the CPUIDs that correspond to the respective processors 0 to i−1 supplied from the peripheral resource 62 and outputs the selected CPUID.

The access addresses output from the CPUs 60_0 to 60_$n$−1 are access addresses that correspond to the processors 0 to i−1 that the CPUs 60_0 to 60_$n$−1 access. Therefore, the TID selection unit 66 is able to select the CPU IDs that correspond to the processors 0 to i−1 that the CPUs 60_0 to 60_$n$−1 access by using the access addresses output from the CPUs 60_0 to 60_$n$−1. The selected CPUID is supplied to the SPID table selection unit 24 as the selected TID.

When, for example, the CPU 60_1 uses the processor 1, the CPUID of the processor 1 is configured to be CPUID=1. The CPU 60_1 outputs the access address=1 that corresponds to the processor 1 as the access address when accessing the processor 1. The TID selection unit 66 outputs CPUID=1 of the processor 1 that corresponds to the access address=1 to the SPID table selection unit 24 as the TID.

In the configuration according to this embodiment, the SPID table unit 23 stores the SPID tables (TID=0 to n−1) that correspond to n CPUIDs=0 to n−1.

Further, since the other configurations, that is, the configurations of the SPID table unit 23, the SPID table selection unit 24, the MID coincidence determination unit 25, and the permission determination unit 26 are similar to those described in the first embodiment, duplicated descriptions thereof will be omitted.

In the data processing apparatus 2 according to this embodiment, the plurality of CPUs 60_0 to 60_$n$−1 share the peripheral resource 62. Further, the respective processors 0 to i−1 include CPUIDs, which are information on the CPUs that use the respective processors 0 to i−1. This configuration is used, for example, for an interruption controller in a case in which, for example, the CPU that will use each channel (processor) is specified. In a multicore system in embedded field, for example, it is often required to manage the configuration of access rights to a memory space and peripheral apparatuses by units of CPUs. The configuration according to this embodiment can be suitably used in these cases.

Further, in the data processing apparatus 2 according to this embodiment, it is possible to change the SPID table to be referred to (i.e., the SPID table used in the MID coincidence determination unit 25) depending on the CPUs that use the processors 0 to i−1. Accordingly, the SPID table is used by units of CPUs and the management of the access rights can be made easier in programming in the multicore system.

That is, in the multicore system, the management of the access rights for causing the plurality of CPUs to use the peripheral resources exclusively or in a shared manner is a serious issue. The data processing apparatus 2 according to this embodiment is able to solve this problem by associating the SPID table to be referred to with the configuration of the CPUs that use the processors 0 to i−1. Further, since there is no need to provide the SPID table configuration (TID) in the permission configuration unit 64, the mounting area can be reduced.

Third Embodiment

Next, a third embodiment will be described.

Figure 19:
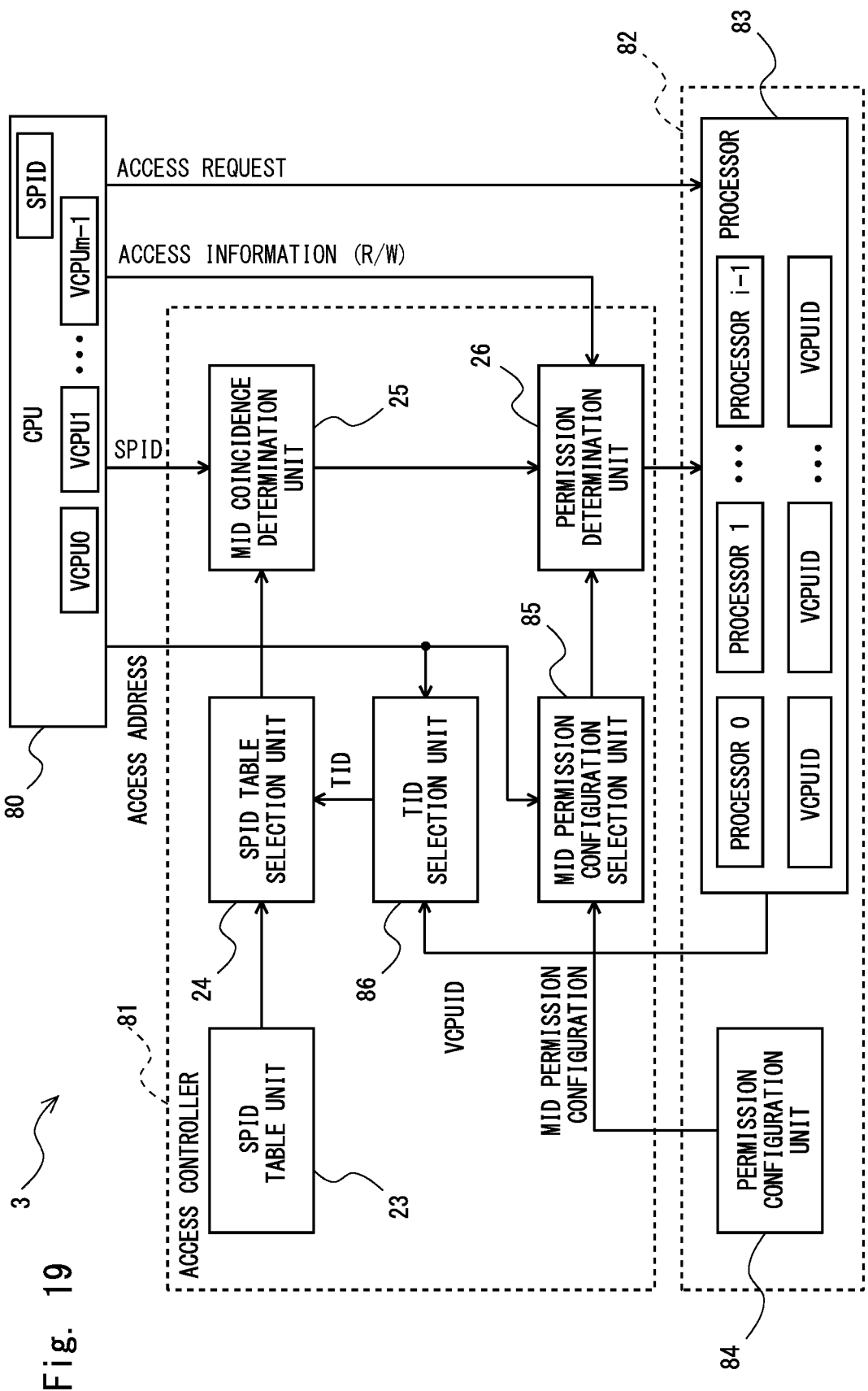
FIG. 19 is a block diagram showing a configuration example of a data processing apparatus according to a third embodiment.

FIG. 19 is a block diagram showing a configuration example of a data processing apparatus according to a third embodiment. A data processing apparatus 3 according to the third embodiment is different from the data processing apparatus 1 described in the first embodiment (see FIG. 2) in that a single CPU 80 includes a plurality of virtual CPUs (VCPU0 to VCPUm−1) and these plurality of virtual CPUs (VCPU0 to VCPUm−1) share a peripheral resource 82. Since the other configurations are similar to those of the data processing apparatus 1 described in the first embodiment (see FIG. 2), the same components are denoted by the same reference symbols and duplicated descriptions thereof will be omitted as appropriate.

As shown in FIG. 19, the data processing apparatus 3 according to this embodiment includes the CPU 80, an access controller 81, and the peripheral resource 82. The access controller 81 includes an MID permission configuration selection unit 85, a TID selection unit 86, the SPID table unit 23, the SPID table selection unit 24, the MID coincidence determination unit 25, and the permission determination unit 26. Further, the peripheral resource 82 includes a processor 83 and a permission configuration unit 84.

The CPU 80 includes the plurality of virtual CPUs (VCPU0 to VCPUm−1). The plurality of virtual CPUs (VCPU0 to VCPUm−1) are configured in such a way that they can access the peripheral resource 82. In this case, the access controller 81 controls the access of the respective virtual CPUs (VCPU0 to VCPUm−1) to the peripheral resource 82.

Each of the virtual CPUs (VCPU0 to VCPUm−1) executes a predetermined program. Further, the CPU 80 stores the access request identifier (SPID). Each of the virtual CPUs (VCPU0 to VCPUm−1) outputs the access address, the SPID, and the access information (R/W) to the access controller 81 when accessing the peripheral resource 82.

The processor 83 of the peripheral resource 82 is provided with processors 0 to i−1 (i is an integer equal to or larger than one). Each of the processors 0 to i−1 provides the main function (interruption processing, etc.) of the peripheral resource 82. Further, the peripheral resource 82 includes the permission configuration unit 84.

Further, in this embodiment, VCPUIDs for configuring the virtual CPUs (VCPU0 to VCPUm−1) that use the respective processors 0 to i−1 are provided. In this embodiment, m virtual CPUs (VCPU0 to VCPUm−1) are provided. Therefore, VCPUID=0 to m is set as the VCPUID. When, for example, VCPUID=0 is configured as the VCPUID that corresponds to the processor 0, this means that the virtual CPU that uses the processor 0 is VCPU0. The VCPUIDs that correspond to the respective processors 0 to i−1 can be arbitrarily configured by the user. The VCPUIDs that correspond to the respective processors 0 to i−1 are output to the TID selection unit 86.

The permission configuration unit 84 includes, similar to the permission configuration unit 14 shown in FIG. 3, permission configuration units 0 to i−1 that correspond to the respective processors 0 to i−1. Each of the permission configuration units 0 to i−1 stores the access permission configuration information (MID permission configuration) configured for each intermediate identifier (MID). In this embodiment, the TID selection unit 86 selects the SPID table configuration (TID) using the VCPUIDs that correspond to the respective processors 0 to i−1. Therefore, in this embodiment, the permission configuration unit 84 does not include the SPID table configuration (TID) included in the permission configuration unit 14 shown in FIG. 3.

As shown in FIG. 19, the permission configuration unit 84 outputs the MID permission configuration to the MID permission configuration selection unit 85. The MID permission configuration selection unit 85 selects the MID permission configuration to be used for the access control from among the MID permission configurations supplied from the permission configuration unit 84 using the access addresses output from the CPU 80 and outputs the selected MID permission configuration to the permission determination unit 26.

The access addresses output from the CPU 80 are access addresses of the processors 0 to i−1 that the virtual CPUs (VCPU0 to VCPUm−1) access and the MID permission configuration selection unit 85 is able to recognize the processors 0 to i−1 that the virtual CPUs (VCPU0 to VCPUm−1) access using these access addresses. Accordingly, the MID permission configuration selection unit 85 is able to select the MID permission configurations 0 to i−1 that correspond to the processors 0 to i−1 that the virtual CPUs (VCPU0 to VCPUm−1) access.

The TID selection unit 86 shown in FIG. 19 selects the VCPUID that corresponds to the access address from among the VCPUIDs that correspond to the respective processors 0 to i−1 supplied from the peripheral resource 82 using the access addresses output from the virtual CPUs (VCPU0 to VCPUm−1) of the CPU 80.

Figure 20:
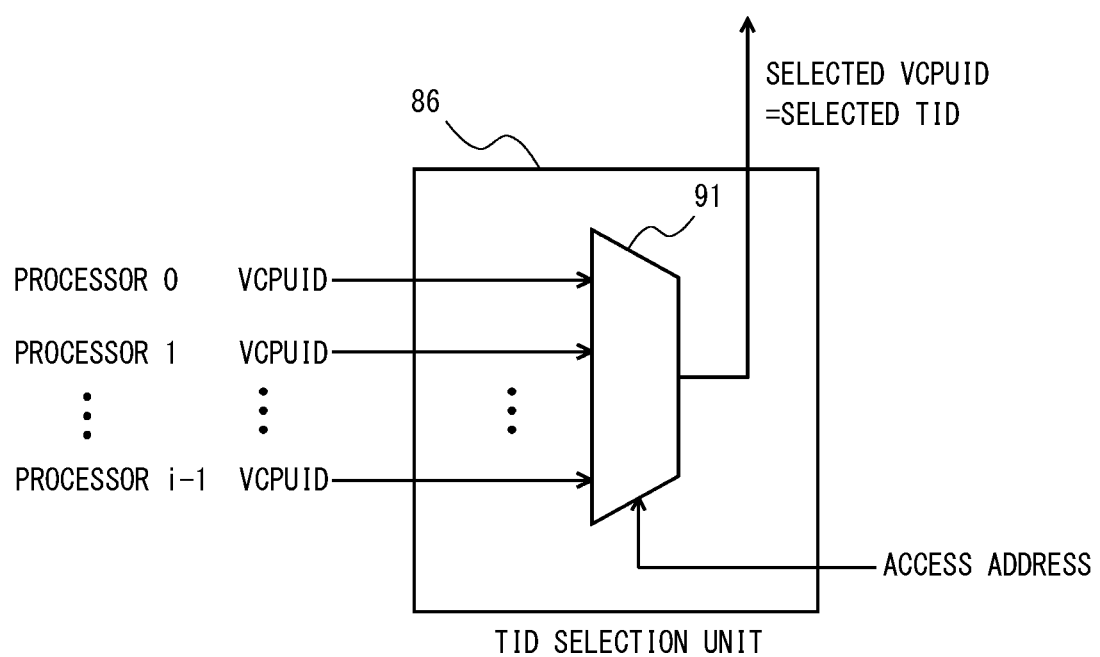
FIG. 20 is a diagram showing a configuration example of a TID selection unit included in the data processing apparatus according to the third embodiment.

FIG. 20 is a diagram showing a configuration example of the TID selection unit 86. As shown in FIG. 20, the TID selection unit 86 includes a selector 91. The selector 91 selects, from among the VCPUIDs that correspond to the respective processors 0 to i−1 supplied from the peripheral resource 82, the VCPUID that corresponds to the access address and outputs the selected VCPUID.

The access addresses output from the CPU 80 correspond to the processors 0 to i−1 that the virtual CPUs (VCPU0 to VCPUm−1) access. Accordingly, the TID selection unit 86 is able to select the VCPUIDs that correspond to the processors 0 to i−1 that the virtual CPUs (VCPU0 to VCPUm−1) access by using the access addresses output from the CPU 80. The selected VCPUID is supplied to the SPID table selection unit 24 as the selected TID.

When, for example, the virtual CPU (VCPU1) uses the processor 1, the VCPUID of the processor 1 is set to VCPUID=1. The virtual CPU (VCPU1) outputs the access address=1 that corresponds to the processor 1 as the access address when accessing the processor 1. The TID selection unit 86 outputs VCPUID=1 of the processor 1 that corresponds to the access address=1 to the SPID table selection unit 24 as the TID.

In the configuration according to this embodiment, the SPID table unit 23 stores the SPID tables (TID=0 to m-1) that correspond to m VCPUID=0 to m-1.

Further, since the other configurations, that is, the configurations of the SPID table unit 23, SPID table selection unit 24, the MID coincidence determination unit 25, and the permission determination unit 26 are similar to those described in the first embodiment, duplicated descriptions thereof will be omitted.

In the data processing apparatus 3 according to this embodiment, the plurality of virtual CPUs (VCPU0 to VCPUm-1) share the peripheral resource 82. Further, the respective processors 0 to i-1 have VCPUIDs, which are information on the virtual CPUs that use the respective processors 0 to i-1. This configuration is used, for example, for an interruption controller in a case in which, for example, the virtual CPU that will use each channel (processor) is specified. In a multicore system in embedded field, for example, it is often required to manage the configuration of access rights to a memory space and peripheral apparatuses by units of virtual CPUs. The configuration according to this embodiment can be suitably used in these cases.

Further, the data processing apparatus 3 according to this embodiment is able to change the SPID table that will be referred to (i.e., the SPID table used in the MID coincidence determination unit 25) depending on the virtual CPUs that use the processors 0 to i-1. Accordingly, the SPID tables are used by units of virtual CPUs, and the management of the access rights can be made easier in programming in the multicore system.

That is, in the multicore system, the management of the access rights for causing the plurality of virtual CPUs to use the peripheral resources exclusively or in a shared manner is a serious issue. In the data processing apparatus 3 according to this embodiment, this problem can be solved by associating the SPID table to be referred to with the configuration of the virtual CPUs that use the processors 0 to i-1. Further, since there is no need to provide the SPID table configuration (TID) in the permission configuration unit 84, the mounting area can be reduced.

Fourth Embodiment

Next, a fourth embodiment will be described.

Figure 21:
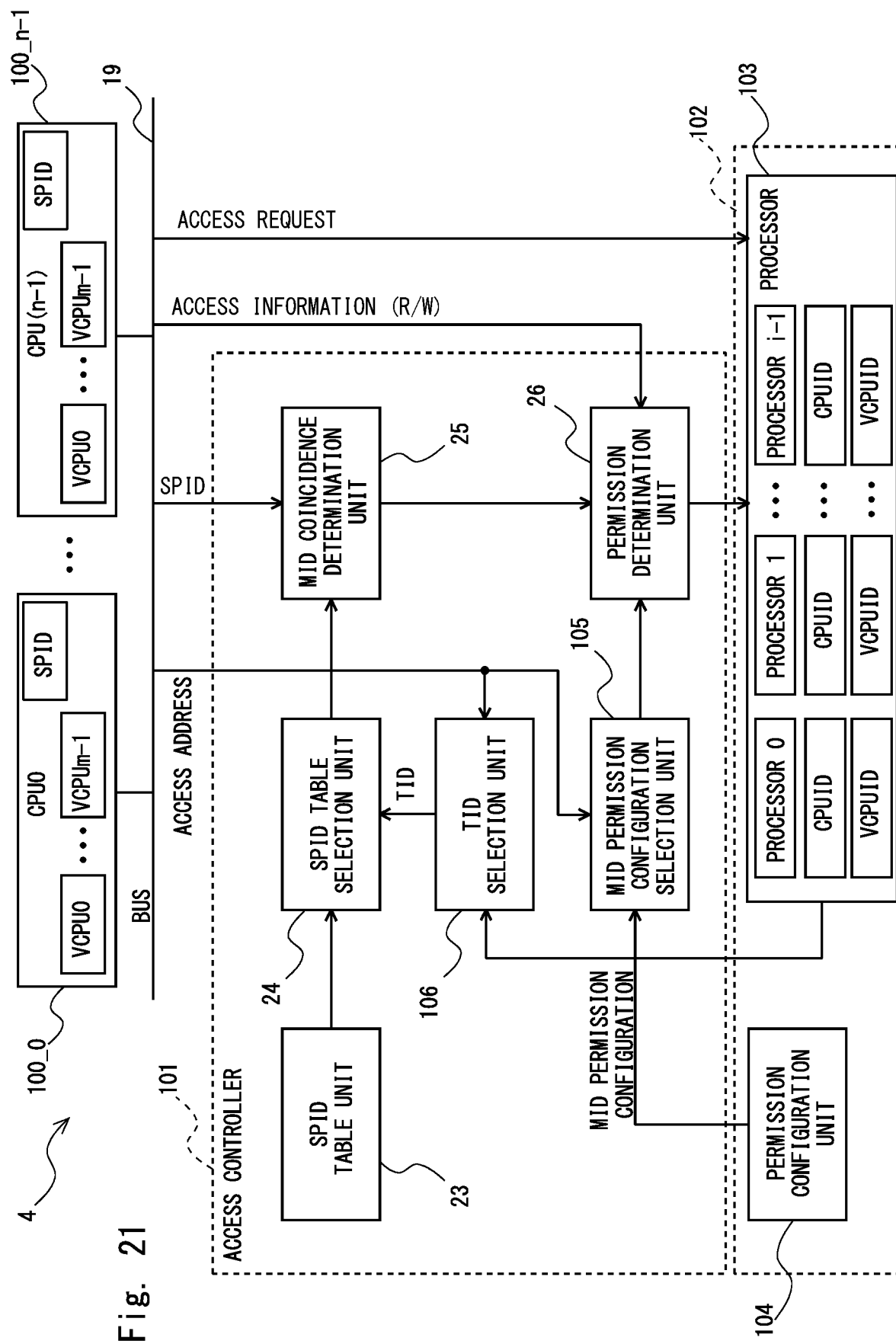
FIG. 21 is a block diagram showing a configuration example of a data processing apparatus according to a fourth embodiment.

FIG. 21 is a block diagram showing a configuration example of a data processing apparatus according to the fourth embodiment. A data processing apparatus 4 according to the fourth embodiment is different from the data processing apparatus 1 described in the first embodiment (see FIG. 2) in that each of a plurality of CPUs 100_0 to 100_*n*-1 includes a plurality of virtual CPUs (VCPU0 to VCPUm-1) and these plurality of virtual CPUs share a peripheral resource 102. That is, the configuration of the fourth embodiment is the configuration according to the second embodiment in combination with the configuration according to the third embodiment. Since the other configurations are similar to those of the data processing apparatus 1 described in the first embodiment (see FIG. 2), the same components are denoted by the same reference symbols and duplicated descriptions thereof will be omitted as appropriate.

As shown in FIG. 21, the data processing apparatus 4 according to this embodiment includes the plurality of CPUs 100_0 to 100_*n*-1, an access controller 101, and the peripheral resource 102. The access controller 101 includes an MID permission configuration selection unit 105, a TID selection unit 106, the SPID table unit 23, the SPID table selection unit 24, the MID coincidence determination unit 25, and the permission determination unit 26. Further, the peripheral resource 102 includes a processor 103 and a permission configuration unit 104.

Each of the CPUs 100_0 to 100_*n*-1 includes the plurality of virtual CPUs (VCPU0 to VCPUm-1). The plurality of CPUs 100_0 to 100_*n*-1 and the plurality of virtual CPUs (VCPU0 to VCPUm-1) are configured in such a way that they can access the peripheral resource 102 via the bus 19. In this case, the access controller 101 controls the access of the plurality of CPUs 100_0 to 100_*n*-1 and the plurality of virtual CPUs (VCPU0 to VCPUm-1) to the peripheral resource 102.

Each of the CPUs 100_0 to 100_*n*-1 and each of the virtual CPUs (VCPU0 to VCPUm-1) executes a predetermined program. Further, each of the CPUs 100_0 to 100_*n*-1 stores the access request identifier (SPID). Each of the CPUs 100_0 to 100_*n*-1 outputs the access address, the SPID, and the access information (R/W) to the access controller 101 when accessing the peripheral resource 102.

The processor 103 of the peripheral resource 102 is provided with processors 0 to i-1 (i is an integer equal to or larger than one). Each of the processors 0 to i-1 provides the main function (interruption processing, etc.) of the peripheral resource 102. Further, the peripheral resource 102 includes the permission configuration unit 104.

Further, in this embodiment, CPUIDs for configuring the CPUs 100_0 to 100_*n*-1 that use the respective processors 0 to i-1 are provided. In this embodiment, n CPUs 100_0 to 100_*n*-1 are provided. Therefore, CPUID=0 to n-1 is configured as the CPUIDs. When, for example, CPUID=0 is configured as the CPUID that corresponds to the processor 0, this means that the CPU that uses the processor 0 is CPU0 (100_0).

Further, in this embodiment, VCPUIDs for configuring the virtual CPUs (VCPU0 to VCPUm-1) that use the respective processors 0 to i-1 are provided. In this embodiment, m virtual CPUs (VCPU0 to VCPUm-1) are provided. Therefore, VCPUID=0 to m is configured as the VCPUIDs. When, for example, VCPUID=0 is configured as the VCPUID that corresponds to the processor 0, this means that the virtual CPU that uses the processor 0 is VCPU0.

The CPUIDs and the VCPUIDs that correspond to the respective processors 0 to i-1 are output to the TID selection unit 106.

The permission configuration unit 104 includes, similar to the permission configuration unit 14 shown in FIG. 3, permission configuration units 0 to i-1 that correspond to the respective processors 0 to i-1. Each of the permission configuration units 0 to i-1 stores the access permission configuration information (MID permission configuration) configured for each intermediate identifier (MID). In this embodiment, the TID selection unit 106 selects the SPID table configuration (TID) using the CPUIDs and VCPUIDs that correspond to the respective processors 0 to i-1. Accordingly, in this embodiment, the permission configuration unit 104 does not include the SPID table configuration (TID) that the permission configuration unit 14 shown in FIG. 3 includes.

As shown in FIG. 21, the permission configuration unit 104 outputs the MID permission configuration to the MID permission configuration selection unit 105. The map permission configuration selection unit 105 selects the MID permission configuration to be used for the access control from among the plurality of MID permission configurations supplied from the permission configuration unit 104 using the access addresses output from the CPUs 100_0 to 100_n−1 and the virtual CPUs (VCPU0 to VCPUm−1) and outputs the selected MID permission configuration to the permission determination unit 26.

The access addresses output from the CPUs 100_0 to 100_n−1 and the virtual CPUs (VCPU0 to VCPUm−1) are access addresses of the processors 0 to i−1 that the CPUs 100_0 to 100_n−1 and the virtual CPUs (VCPU0 to VCPUm−1) access, and the MID permission configuration selection unit 105 is able to recognize the processors 0 to i−1 that the CPUs 100_0 to 100_n−1 and the virtual CPUs (VCPU0 to VCPUm−1) access using this access address. Therefore, the MID permission configuration selection unit 105 is able to select the MID permission configurations 0 to i−1 that correspond to the processors 0 to i−1 that the CPUs 100_0 to 100_n−1 and the virtual CPUs (VCPU0 to VCPUm−1) access.

Figure 22:
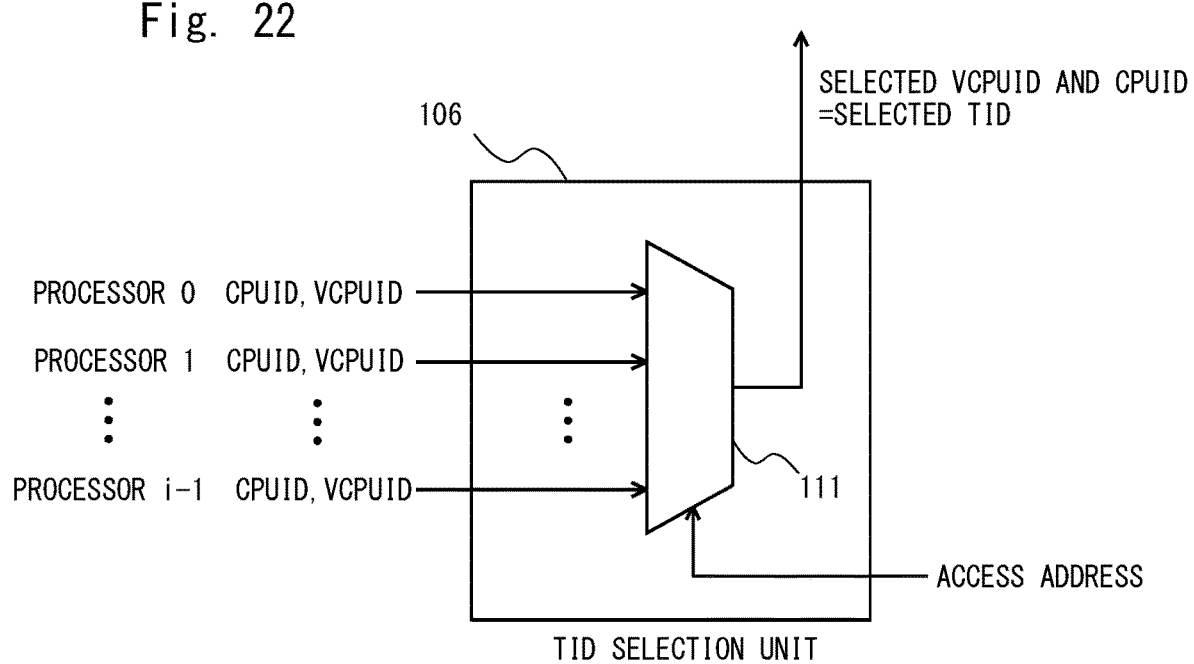
FIG. 22 is a diagram showing a configuration example of a TID selection unit included in the data processing apparatus according to the fourth embodiment.

The TID selection unit 106 shown in FIG. 22 selects the CPUID and the VCPUID that correspond to the access address from among the CPUIDs and the VCPUIDs that correspond to the respective processors 0 to i−1 supplied from the peripheral resource 102 using the access addresses output from the CPUs 100_0 to 100_n−1 and the virtual CPUs (VCPU0 to VCPUm−1).

FIG. 22 is a diagram showing a configuration example of the TID selection unit 106. As shown in FIG. 22, the TID selection unit 106 includes a selector 111. The selector 111 selects the CPUID and the VCPUID that correspond to the access address from among the CPUIDs and the VCPUIDs that correspond to the respective processors 0 to i−1 supplied from the peripheral resource 102 and outputs the selected CPUID and VCPUID.

The access addresses output from the CPUs 100_0 to 100_n−1 and the virtual CPUs (VCPU0 to VCPUm−1) are access addresses that correspond to the processors 0 to i−1 that the CPUs 100_0 to 100_n−1 and the virtual CPUs (VCPU0 to VCPUm−1) access. Therefore, the TID selection unit 106 is able to select the CPUIDs and the VCPUIDs that correspond to the processors 0 to i−1 that the CPUs 100_0 to 100_n−1 and the virtual CPUs (VCPU0 to VCPUm−1) access by using the access addresses output from the CPUs 100_0 to 100_n−1 and the virtual CPUs (VCPU0 to VCPUm−1). The selected CPUID and VCPUID are supplied to the SPID table selection unit 24 as the selected TID.

Since the other configurations, that is, the configurations of the SPID table unit 23, the SPID table selection unit 24, the MID coincidence determination unit 25, and the permission determination unit 26 are similar to those described in the first embodiment, duplicated descriptions thereof will be omitted.

In the data processing apparatus 4 according to this embodiment, the CPUs 100_0 to 100_n−1 and the virtual CPUs (VCPU0 to VCPUm−1) share the peripheral resource 102. Further, the respective processors 0 to i−1 include the CPUIDs and the VCPUIDs, which are information on the CPUs and the virtual CPUs that use the respective processors 0 to i−1. This configuration is used, for example, for an interruption controller in a case in which, for example, the CPUs and the virtual CPUs that use the respective channels (processors) are specified. In a multicore system in embedded field, for example, it is often required to manage the configuration of access rights to a memory space and peripheral apparatuses by units of CPUs and virtual CPUs. The configuration according to this embodiment can be suitably used in these cases.

Other Embodiments

Figure 23:
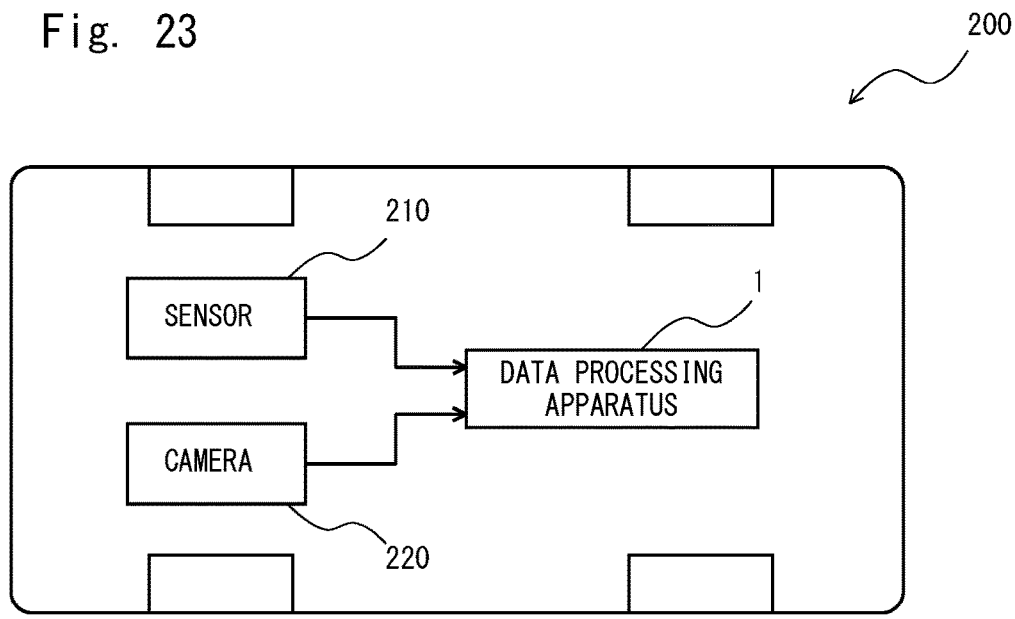
FIG. 23 is a block diagram showing a configuration example when the data processing apparatus according to the first embodiment is used for a vehicle.

FIG. 23 is a block diagram showing a configuration example when the data processing apparatus according to the first embodiment is used for a vehicle. As shown in FIG. 23, a vehicle 200 is provided with the data processing apparatus 1, a sensor 210, and a camera 220. The data processing apparatus 1 is an in-vehicle chip. The sensor 210 acquires predetermined information on the vehicle 200. Further, the camera 220 acquires images around the vehicle. The information acquired by the sensor 210 and the camera 220 is supplied to the data processing apparatus 1. The data processing apparatus 1 executes predetermined processing in accordance with the information acquired by the sensor 210 and the camera 220.

In this case, the access controller 11 (see FIG. 2) included in the data processing apparatus 1 according to the first embodiment controls the access to the peripheral resources (peripheral apparatuses) by the CPU. It is therefore possible to suppress the CPU from fraudulently accessing the peripheral resources (the peripheral apparatuses). Note that the data processing apparatus 2 or 3 described in the second to fourth embodiments may be used in place of the data processing apparatus 1 shown in FIG. 23.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:
1. A data processing apparatus comprising:
an operation unit;
a processor that the operation unit accesses;
an access controller configured to control access by the operation unit to the processor; and
a permission configuration circuit configured to set accessibility of the operation unit to the processor, wherein
the access controller includes an identifier table in which an intermediate identifier having an n-bit width where n is an integer and an access request identifier having a m-bit width where m is an integer greater than n are associated with each other,
the permission configuration circuit stores permission configuration information including access permission configuration information configured for each intermediate identifier in such a way that the permission configuration information is associated with the processor,
the operation unit outputs processor selection information, which is information regarding the processor that the operation unit accesses, and the access request identifier to the access controller, the access controller selects permission configuration information to be used for the access control using the processor selection information output from the operation unit, the access controller selects an identifier table to be used for the access control using the processor selection information output from the operation unit, the access controller determines the intermediate identifier that corresponds to the access request identifier output from the operation unit using the selected identifier table, and the access controller determines accessibility of the operation unit to the processor using the selected permission configuration information and the determined intermediate identifier.

2. The data processing apparatus according to claim 1, wherein the permission configuration circuit stores the permission configuration information in which identifier table configuration information, which is information regarding an identifier table to be used for the access control, and the access permission configuration information configured for each intermediate identifier are associated with each other, the access controller selects identifier table configuration information to be used for the access control from the identifier table configuration information included in the permission configuration information using the processor selection information output from the operation unit, and the access controller selects an identifier table to be used for the access control using the selected identifier table configuration information.

3. The data processing apparatus according to claim 2, wherein the processor selection information is an access address of the processor that the operation unit accesses, the access controller selects permission configuration information that corresponds to the processor of the access address using the access address output from the operation unit, and the access controller selects an identifier table that corresponds to the processor of the access address using the access address output from the operation unit.

4. The data processing apparatus according to claim 1, further comprising:

a plurality of operation units including the operation unit; and a plurality of processors including the processor, wherein each of the operation units is associated with at least one of the processors, the access controller includes a plurality of identifier tables including the identifier table, and when one of the operation units accesses one of the processors, the access controller selects one of the identifier tables corresponding to the one of the processors using an access address output from the one of the operation units.

5. The data processing apparatus according to claim 4, wherein each of the processors includes an operation unit ID, the operation unit ID is information regarding one associated operation unit, the access controller selects one of operation unit IDs that corresponds to the access address, and the access controller selects corresponding one of the identifier tables using the selected operation unit ID.

6. The data processing apparatus according to claim 1, further comprising a plurality of processors including the processor, wherein the operation unit includes a plurality of virtual operation units and each of the virtual operation units is associated with one of the processors, the access controller includes a plurality of identifier tables including the identifier table, and when one of the virtual operation units accesses one of the processors, the access controller selects one of the identifier tables corresponding to the one of the processors using an access address output from the one of the virtual operation units.

7. The data processing apparatus according to claim 6, wherein each of the processors include a virtual operation unit ID, the virtual operation unit ID is information regarding one associated virtual operation unit, the access controller selects one of the virtual operation unit IDs of one of the processors that corresponds to the access address, and the access controller selects one of the identifier tables using the selected virtual operation unit ID.

8. The data processing apparatus according to claim 1, further comprising:

a plurality of operation units including the operation unit; and a plurality of processors including the processor, wherein each of the operation units is associated with at least one of the processors, each of the operation units includes a plurality of virtual operation units and each of the virtual operation units is associated with corresponding one of the processors, the access controller includes a plurality of identifier tables including the identifier table, and when one of the virtual operation units in one of the operation units accesses one of the processors, the access controller selects one of the identifier tables corresponding to the one of the processors using an access address output from the one of the virtual operation units.

9. The data processing apparatus according to claim 8, wherein each of the processors includes an operation unit ID and a virtual operation unit ID, which are information regarding one associated operation unit and one associated virtual operation unit, respectively, the access controller selects one of the operation unit IDs and one of the virtual operation unit IDs each included in the processor that corresponds to the access address, and the access controller selects one of the identifier tables using the selected one of the operation unit IDs and the selected one of the virtual operation unit IDs.

10. The data processing apparatus according to claim 1, wherein the access controller further determines accessibility of the operation unit to the processor using access information, which is information regarding a type of access output from the operation unit, and the selected permission configuration information.

* * * * *